United States Patent
Matsuoka et al.

(10) Patent No.: US 9,893,378 B2
(45) Date of Patent: Feb. 13, 2018

(54) NON-AQUEOUS ELECTROLYTE SOLUTION AND NON-AQUEOUS SECONDARY BATTERY

(75) Inventors: Naoki Matsuoka, Tokyo (JP); Takehiro Koga, Tokyo (JP); Hitoshi Shobukawa, Tokyo (JP); Akira Yoshino, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 1162 days.

(21) Appl. No.: 13/881,553

(22) PCT Filed: Oct. 28, 2011

(86) PCT No.: PCT/JP2011/074928
§ 371 (c)(1),
(2), (4) Date: Apr. 25, 2013

(87) PCT Pub. No.: WO2012/057311
PCT Pub. Date: May 3, 2012

(65) Prior Publication Data
US 2013/0224535 A1    Aug. 29, 2013

(30) Foreign Application Priority Data

Oct. 29, 2010  (JP) ................. 2010-244503
Oct. 29, 2010  (JP) ................. 2010-244513

(51) Int. Cl.
*H01M 10/056* (2010.01)
*H01M 10/052* (2010.01)
(Continued)

(52) U.S. Cl.
CPC ....... *H01M 10/056* (2013.01); *H01M 10/052* (2013.01); *H01M 10/0525* (2013.01);
(Continued)

(58) Field of Classification Search
CPC .................................................. H01M 10/056
See application file for complete search history.

(56) References Cited

U.S. PATENT DOCUMENTS

| 8,313,866 B2 | 11/2012 | Ofer et al. |
| 2004/0013946 A1* | 1/2004 | Abe ............ H01M 6/168 429/326 |

(Continued)

FOREIGN PATENT DOCUMENTS

| EP | 1215745 A1 | 6/2002 |
| EP | 2151882 A1 | 2/2010 |

(Continued)

OTHER PUBLICATIONS

JP H04-351860 MT.*

(Continued)

*Primary Examiner* — Alex Usyatinsky
(74) *Attorney, Agent, or Firm* — Morgan, Lewis & Bockius LLP

(57) ABSTRACT

The non-aqueous electrolyte solution of the present invention is a non-aqueous electrolyte solution comprising acetonitrile and a lithium salt, wherein the anion of the lithium salt has a LUMO (lowest unoccupied molecular orbital) energy in the range of −2.00 to 4.35 eV, and a HOMO (highest occupied molecular orbital) energy in the range of −5.35 to −2.90 eV.

29 Claims, 1 Drawing Sheet

(51) Int. Cl.
    *H01M 10/0567*     (2010.01)
    *H01M 10/0568*     (2010.01)
    *H01M 10/0569*     (2010.01)
    *H01M 10/0525*     (2010.01)

(52) U.S. Cl.
    CPC ... *H01M 10/0567* (2013.01); *H01M 10/0568* (2013.01); *H01M 10/0569* (2013.01); *H01M 2300/0028* (2013.01)

(56) References Cited

U.S. PATENT DOCUMENTS

| | | | | |
|---|---|---|---|---|
| 2006/0024577 | A1* | 2/2006 | Schwake | H01G 9/038 429/188 |
| 2006/0240322 | A1 | 10/2006 | Xu et al. | |
| 2006/0257743 | A1 | 11/2006 | Kuratomi et al. | |
| 2007/0231705 | A1 | 10/2007 | Ohzuku et al. | |
| 2009/0029249 | A1* | 1/2009 | Takami | H01M 4/366 429/188 |
| 2009/0325065 | A1* | 12/2009 | Fujii | H01M 4/04 429/199 |

FOREIGN PATENT DOCUMENTS

| | | |
|---|---|---|
| JP | H04-351860 A | 12/1992 |
| JP | 2000-048862 A | 2/2000 |
| JP | 3154719 B | 2/2001 |
| JP | 3239267 B | 10/2001 |
| JP | 2004-179146 A | 6/2004 |
| JP | 2004-265849 A | 9/2004 |
| JP | 2007-273405 A | 10/2007 |
| JP | 2008-052965 A | 3/2008 |
| JP | 2009-21134 A | 1/2009 |
| JP | 2009-140641 A | 6/2009 |
| JP | 2010-528431 A | 8/2010 |
| JP | 2011-034893 A | 2/2011 |
| KR | 10-2008-0004459 A | 1/2008 |

OTHER PUBLICATIONS

Kang et al, Electrochimica Acta 46 (2001) 1823-1827.*
Search Report issued in corresponding European Patent Application No. 11836444.7 dated Jan. 7, 2014.
Search Report issued in corresponding International Patent Application No. PCT/JP2011/074928 dated Jan. 24, 2012.

* cited by examiner

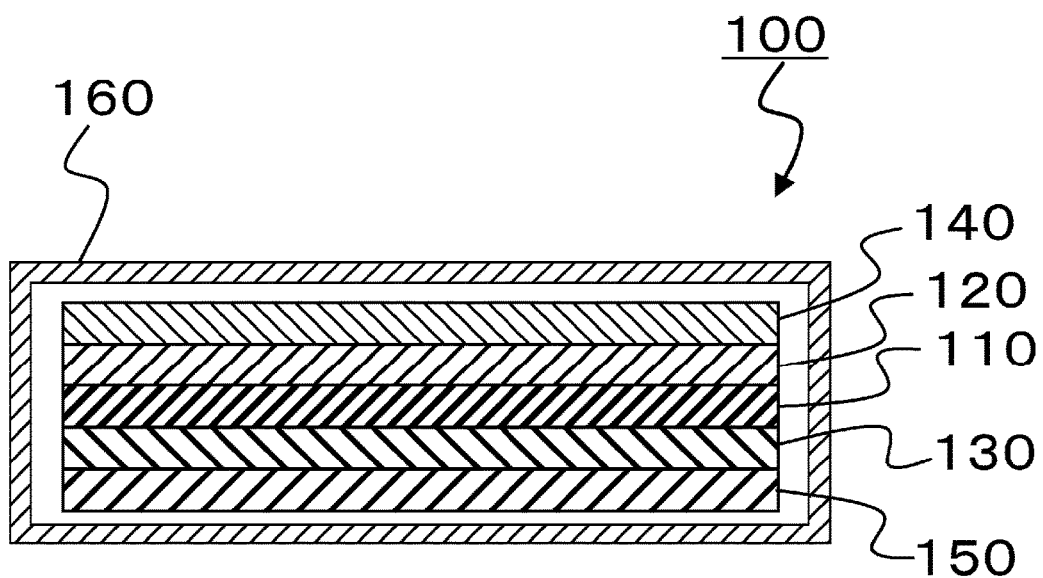

NON-AQUEOUS ELECTROLYTE SOLUTION AND NON-AQUEOUS SECONDARY BATTERY

TECHNICAL FIELD

The present invention relates to a non-aqueous electrolyte solution and a non-aqueous secondary battery.

BACKGROUND ART

A non-aqueous secondary battery comprising a non-aqueous electrolyte solution is typically characterized by light weight, high energy, and long life, and it has been widely used as a source for portable electronic devices such as notebook computers, mobile phones, digital cameras, and video cameras. In addition, with transition to a society with less environmental burden, such a non-aqueous secondary battery has attracted attention as a source for hybrid electric vehicles (hereinafter abbreviated as "HEV") and plug-in hybrid electric vehicles (hereinafter abbreviated as "PHEV"), and also in the field of power storage such as a power storage system for residence.

When a non-aqueous secondary battery is applied to vehicles such as automobiles and power storage systems for residence, materials excellent in terms of chemical or electrochemical stability, strength, corrosion resistance, etc. are required as constituent materials for the battery, from the viewpoint of cycling performance and long-term reliability under a high temperature environment. Moreover, the use conditions of such a non-aqueous secondary battery are largely different from those of a source for portable electronic devices, and the non-aqueous secondary battery must work even in a cold region. Accordingly, high-rate performance and long-term stability under a low temperature environment are also required as physical properties necessary for the non-aqueous secondary battery.

By the way, from the viewpoint of practical use, a non-aqueous electrolyte solution is desirably used as an electrolyte solution for a lithium ion secondary battery that works at an ordinary temperature. An example of a common solvent used therefor is a combination of a high-dielectric solvent such as a cyclic carbonate with a low-viscosity solvent such as a lower acyclic carbonate. On the other hand, a common high-dielectric solvent has a high melting point, and thus, it may cause deterioration of the low-temperature properties of an electrolyte used, depending on the type of the electrolyte solution. As a solvent capable of solving this problem, there has been proposed a nitrile solvent having a good balance between viscosity and relative dielectric constant. Among others, acetonitrile has been known as a solvent having prominent performance. However, since these solvents containing a nitrile group are seriously disadvantageous in terms of electrochemical reductive decomposition, several improvement plans have been reported.

For example, Patent Documents 1 and 2 disclose that a cyclic carbonate such as ethylene carbonate is mixed with a nitrile solvent such as acetonitrile and diluted so as to prepare an electrolyte solution with a reduced influence by reductive decomposition. Moreover, Patent Document 2 to 4 disclose that a negative electrode having a potential higher than the reduction potential of a nitrile solvent is used to produce a battery, in which the reductive decomposition of the nitrile solvent is suppressed. Furthermore, Patent Document 5 discloses a non-aqueous electrolyte solution, in which sulfur dioxide and one or more other aprotic polar solvents are added to a nitrile solvent for the purpose of forming a protective film on a negative electrode.

CITED LIST

Patent Document

Patent Document 1: Japanese Patent No. 3154719
Patent Document 2: Japanese Patent Laid-Open No. 2009-21134
Patent Document 3: Japanese Patent No. 3239267
Patent Document 4: Japanese Patent Laid-Open No. 2007-273405
Patent Document 5: National Publication of International Patent Application No. 2010-528431

SUMMARY OF INVENTION

Technical Problem

However, in the case of the electrolyte solutions described in Patent Documents 1 and 2, a nitrile solvent such as acetonitrile must be diluted to such an extent that the performance of the nitrile solvent cannot be sufficiently exhibited. If the negative electrodes described in Patent Document 2 to 4 are used, the feature of a lithium ion secondary battery or the like that is high voltage must be sacrificed. In an extreme case, in Patent Document 5, since a highly reactive gas is used as an additive, addition of such a gas is already extremely difficult. In addition, if the gas is volatized, the inside of the battery becomes pressurized. This results in practically extremely serious problem such as the expansion of the battery, or in a case, the rupture of the battery.

On the other hand, with regard to all of these known techniques, the reductive decomposition of a nitrile solvent in a negative electrode has been emphasized. These patent documents describe that if the reaction of a negative electrode were solved, it could be used as a secondary battery, although several minor problems would still remain. However, when the negative electrodes described in Patent Documents 2 and 4 are used for example, namely, even when a charge-discharge cycle is repeated under an environment in which reductive decomposition cannot occur in a negative electrode, internal resistance is largely increased in comparison with a conventional lithium ion secondary battery. However, these patent documents do not describe such a problem at all. Such an increase in internal resistance must be caused not only by reductive decomposition in a negative electrode but also by other factors. An optimal non-aqueous electrolyte solution has not necessarily been provided, and thus it has been strongly desired to further improve the non-aqueous electrolyte solution.

The present invention has been made under the above-mentioned circumstances, and it is an object of the present invention to provide a non-aqueous electrolyte solution that realizes a non-aqueous secondary battery having high-rate performance, and such a non-aqueous secondary battery.

Solution to Problem

As a result of intensive studies directed towards achieving the above-mentioned object, the present inventors have found that a non-aqueous electrolyte solution containing at least acetonitrile and a specific lithium salt can realize a non-aqueous secondary battery having high-rate performance, thereby completing the present invention. Specifically, the present invention is as follows.

[1] A non-aqueous electrolyte solution containing acetonitrile and an organic lithium salt, wherein an anion of the organic lithium salt has a LUMO (lowest unoccupied molecular orbital) energy in the range of −2.00 to 4.35 eV, and a HOMO (highest occupied molecular orbital) energy in the range of −5.35 to −2.90 eV.

[2] The non-aqueous electrolyte solution according to [1], wherein the anion of the organic lithium salt has a LUMO (lowest unoccupied molecular orbital) energy in the range of −1.00 to 2.70 eV, and a HOMO (highest occupied molecular orbital) energy in the range of −4.50 to −3.00 eV.

[3] The non-aqueous electrolyte solution according to [1] or [2], wherein the mass percentage of the organic lithium salt is 0.1% to 30% based on the total mass of the non-aqueous electrolyte solution.

[4] The non-aqueous electrolyte solution according to any one of [1] to [3], wherein the volume percentage of the acetonitrile is 70% to 100% based on the total volume of ingredients contained in the non-aqueous electrolyte solution, other than the organic lithium salt.

[5] The non-aqueous electrolyte solution according to any one of [1] to [3], which further contains an inorganic lithium salt.

[6] The non-aqueous electrolyte solution according to [5], wherein the inorganic lithium salt is a compound having a fluorine atom.

[7] The non-aqueous electrolyte solution according to [5] or [6], wherein the mass percentage of the inorganic lithium salt is 0.1% to 40% based on the total mass of the non-aqueous electrolyte solution.

[8] The non-aqueous electrolyte solution according to any one of [5] to [7], wherein the volume percentage of the acetonitrile is 70% to 100% based on the total volume of ingredients contained in the non-aqueous electrolyte solution, other than the organic lithium salt or the inorganic lithium salt.

[9] The non-aqueous electrolyte solution according to any one of [5] to [8], wherein the inorganic lithium salt comprises phosphorus atom.

[10] The non-aqueous electrolyte solution according to any one of [5] to [9], wherein the inorganic lithium salt is $LiPF_6$.

[11] The non-aqueous electrolyte solution according to any one of [5] to [10], wherein the organic lithium salt and the inorganic lithium salt satisfy the condition represented by the following formula (1):

$$0.05 \leq X \leq 1 \quad (1)$$

wherein X represents the molar ratio of the inorganic lithium salt to the organic lithium salt.

[12] The non-aqueous electrolyte solution according to any one of [1] to [11], which further contains a non-nitrile additive having a LUMO (lowest unoccupied molecular orbital) energy in the range of −3.00 to 0.90 eV.

[13] The non-aqueous electrolyte solution according to [12], wherein the non-nitrile additive having a LUMO (lowest unoccupied molecular orbital) energy in the range of −3.00 to 0.90 eV has a HOMO (highest occupied molecular orbital) energy in the range of −9.55 to −6.00 eV.

[14] The non-aqueous electrolyte solution according to [12], wherein the non-nitrile additive having a LUMO (lowest unoccupied molecular orbital) energy in the range of −3.00 to 0.90 eV has a HOMO (highest occupied molecular orbital) energy in the range of −8.50 to −7.25 eV.

[15] The non-aqueous electrolyte solution according to any one of [12] to [14], wherein the mass percentage of the non-nitrile additive is 0.1% to 30% based on the total mass of the non-aqueous electrolyte solution.

[16] The non-aqueous electrolyte solution according to any one of [12] to [15], wherein the mass percentage of the non-nitrile additive is 0.1% to 10% based on the total mass of the non-aqueous electrolyte solution.

[17] The non-aqueous electrolyte solution according to any one of [12] to [16], which contains two or more types of the non-nitrile additives.

[18] The non-aqueous electrolyte solution according to any one of [12] to [17], wherein the non-nitrile additives comprise one or more types of compounds selected from the group consisting of carbonates.

[19] The non-aqueous electrolyte solution according to [18], wherein the carbonates are cyclic carbonates.

[20] The non-aqueous electrolyte solution according to [18] or [19], wherein the carbonates are compounds having a carbon-carbon double bond.

[21] The non-aqueous electrolyte solution according to any one of [12] to [20], wherein the non-nitrile additives comprise one or more types of compounds selected from the group consisting of compounds represented by the following general formula (2):

$$R^1\text{-}A\text{-}R^2 \quad (2)$$

wherein $R^1$ and $R^2$ each independently represent an alkyl group optionally substituted with an aryl group or a halogen atom, or an aryl group optionally substituted with an alkyl group or a halogen atom, or $R^1$ and $R^2$ bind to each other and, together with A, they form a cyclic structure optionally having an unsaturated bond; and A represents a divalent group having a structure represented by any one of the following formulae (3) to (7):

[Formula 1]

(3)

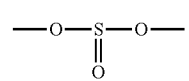

(4)

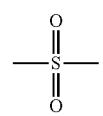

(5)

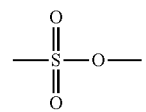

(6)

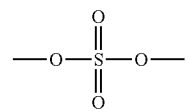

(7)

[22] The non-aqueous electrolyte solution according to [21], wherein, in the formula (2), $R^1$ and $R^2$ each independently represent an alkyl group containing 1 to 4 carbon atoms that is optionally substituted with a phenyl group or a halogen atom, or a phenyl group optionally substituted with a halogen atom, or $R^1$ and $R^2$ bind to each other and, together with A, they form a cyclic structure optionally having an unsaturated bond.

[23] The non-aqueous electrolyte solution according to [21] or [22], wherein the compounds represented by the formula (2) comprise one or more types of compounds selected from the group consisting of ethylene sulfite, propylene sulfite, butylene sulfite, pentene sulfite, sulfolane, 3-methyl sulfolane, 3-sulfolene, 1,3-propanesultone, 1,4-butanesultone, 1,3-propanediol sulfate, and tetramethylene sulfoxide.

[24] The non-aqueous electrolyte solution according to any one of [1] to [23], wherein the organic lithium salt is an organic lithium salt having a boron atom.

[25] The non-aqueous electrolyte solution according to any one of [1] to [24], wherein the organic lithium salt is an organic lithium salt having an organic ligand.

[26] The non-aqueous electrolyte solution according to any one of [1] to [25], wherein the organic lithium salt is one or more types of organic lithium salts selected from the group consisting of lithium bis(oxalato)borate and lithium difluoro(oxalato)borate.

[27] The non-aqueous electrolyte solution according to any one of [1] to [26], which further contains a dinitrile compound.

[28] The non-aqueous electrolyte solution according to [27], wherein the dinitrile compound comprises one or more types of compounds selected from the group consisting of compounds represented by the following general formula (8):

$$NC-(CR^3R^4)_{2a}-CN \quad (8)$$

wherein $R^3$ and $R^4$ each independently represent a hydrogen atom or an alkyl group, and a represents an integer from 1 to 6.

[29] The non-aqueous electrolyte solution according to any one of [1] to [28], which further contains an ionic compound.

[30] The non-aqueous electrolyte solution according to [29], wherein a cation of the ionic compound is a cation having a nitrogen atom.

[31] The non-aqueous electrolyte solution according to [30], wherein the cation having a nitrogen atom is a pyridinium cation.

[32] The non-aqueous electrolyte solution according to any one of [29] to [31], wherein an anion of the ionic compound is $PF_6^-$.

[33] A non-aqueous secondary battery comprising the non-aqueous electrolyte solution according to any one of [1] to [32], a positive electrode, and a negative electrode.

[34] The non-aqueous secondary battery according to [33], wherein the positive electrode contains, as positive-electrode active materials, one or more types of materials selected from the group consisting of materials capable of doping and dedoping lithium ions, and the negative electrode contains, as negative-electrode active materials, one or more types of materials selected from the group consisting of materials capable of doping and dedoping lithium ions and metallic lithium.

[35] The non-aqueous secondary battery according to [34], wherein the positive electrode contains lithium-containing compounds as such positive-electrode active materials.

[36] The non-aqueous secondary battery according to [35], wherein the lithium-containing compounds comprise one or more types of compounds selected from the group consisting of metal oxides having lithium and metal chalcogenides having lithium.

[37] The non-aqueous secondary battery according to any one of [34] to [36], wherein the negative electrode contains, as negative-electrode active materials, one or more types of materials selected from the group consisting of metallic lithium, a carbon material, and a material containing an element capable of forming an alloy with lithium.

[38] The non-aqueous secondary battery according to any one of [34] to [37] wherein the negative electrode contains, as negative-electrode active materials, materials capable of doping lithium ions at a potential lower than 0.4 V vs. $Li/Li^+$.

[39] A method for producing the non-aqueous secondary battery according to any one of [33] to [38], comprising initially charging up to a charge of 0.001 to 0.3 C to the battery.

[40] The method for producing the non-aqueous secondary battery according to [39], wherein the initial charge is carried out via a constant-voltage charge.

Advantageous Effects of Invention

According to the present invention, a non-aqueous electrolyte solution that realizes a non-aqueous secondary battery having a high-rate performance and a non-aqueous secondary battery can be provided.

BRIEF DESCRIPTION OF DRAWINGS

FIG. 1 is a cross-sectional view schematically showing an example of the non-aqueous secondary battery of the present embodiment.

DESCRIPTION OF EMBODIMENTS

Hereinafter, the embodiment for carrying out the present invention (hereinafter simply referred to as "the present embodiment") will be described in detail. It is to be noted that the range described with the preposition "to" includes numerical values before and after the preposition in the present specification. The non-aqueous electrolyte solution of the present embodiment (hereinafter simply referred to as an "electrolyte solution" at times) contains acetonitrile and a lithium salt. Moreover, the non-aqueous secondary battery of the present embodiment is a secondary battery comprising a positive electrode, a negative electrode, and the above described electrolyte solution. An example of the non-aqueous secondary battery of the present embodiment is a lithium ion secondary battery comprising: a positive electrode containing, as positive-electrode active materials, one or more materials selected from the group consisting of materials capable of doping and dedoping lithium ions; and a negative electrode containing, as negative-electrode active materials, one or more materials selected from the group consisting of negative electrode materials capable of doping and dedoping lithium ions and metallic lithium.

The non-aqueous secondary battery of the present embodiment is, for example, a lithium ion secondary battery, the cross-sectional view of which is schematically shown in FIG. 1. A lithium ion secondary battery 100 as shown in FIG. 1 comprises: a separator 110; a positive electrode 120 and a negative electrode 130 that sandwich the separator 110 from both sides; a positive electrode current collector 140 (disposed outside the positive electrode) and a negative electrode current collector 150 (disposed outside the negative electrode) that further sandwich the laminated body; and an outer package of battery 160 that accommodates these parts. The laminated body formed by laminating the positive electrode 120, the separator 110, and the negative electrode 130 is impregnated with the electrolyte solution according to the present embodiment. Except for the electrolyte solution, members comprised in a conventional lithium ion secondary battery can be used herein as the members mentioned below. The members as described later may be used, for example.

<Electrolyte Solution>

The electrolyte solution according to the present embodiment contains acetonitrile and an organic lithium salt. The term "organic lithium salt" is used herein to mean a lithium salt that is soluble in acetonitrile containing a carbon atom in the anion thereof. The after-mentioned "inorganic lithium salt" is a lithium salt that is soluble in acetonitrile containing no carbon atoms in the anion thereof. The present inventors have analyzed in detail the electrochemical reactivity of the organic lithium salt according to a computational chemical method, and as a result, they have discovered the range of a LUMO (lowest unoccupied molecular orbital) energy and the range of a HOMO (highest occupied molecular orbital) energy of the anion, which are able to suppress the reductive decomposition of acetonitrile and an increase in internal resistance. Herein, the computational chemical method of the present embodiment indicates quantum chemical calculation according to the density functional theory (DFT) (hereinafter simply referred to as "DFT calculation" at times). Specifically, quantum chemical calculation program, Gaussian 03 (manufactured by Gaussian), is used, and based on a combination of a B3LYP density function with a 6-31+G* basis set (hereinafter, the combination of a density function with a basis set will be referred to as "B3LYP/6-31+G*"), structural optimization and energy calculation are carried out. The anion of an organic lithium salt is negatively charged, and thus its electron distribution is expanded to a region that is apart from an atomic nucleus, in comparison with a neutral molecule. Accordingly, a highly accurate calculation is carried out by adding a diffuse function. The electron configuration of the anion of an organic lithium salt is a closed-shell configuration, and the molecular orbital of a spin is identical to that of β spin. Therefore, an RHF (spin-Restricted Hartree-Fock) method is applied.

Since the initial structure of anion molecules is largely influence on the convergence of structural optimization according to the DFT calculation, accuracy is increased by the following procedures. First, molecular modeling software, GaussView 3.0 (manufactured by Gaussian), is used to form the molecular structure of the anion, and Clean in Edit is then clicked to obtain an initial coordinate. Thereafter, a low-accuracy calculation is carried out using a small basis set, and using the obtained structure as an initial structure, the structure is then optimized using a higher-accuracy basis set. As a small basis set with low accuracy in the present embodiment, STO-3G and 3-21G are generally used in this order. However, in the case of a compound that is easily converged by considering d orbital, such as a hypervalent compound, the structure is optimized using a high-accuracy basis set from the beginning. These structural optimization procedures are merely means for converging calculations, and these procedures have no influence on the final energy calculation results after the structural optimization has been converged.

The anion of the organic lithium salt of the present embodiment has the above-calculated LUMO energy that is in the range of −2.00 to 4.35 eV, and the above-calculated HOMO energy that is in the range of −5.35 to −2.90 eV. The reaction in which electrons enter the LUMO is a reductive reaction, whereas the reaction in which electrons leave from the HOMO is an oxidation reaction. Thus, the LUMO energy and the HOMO energy correlate with the electrochemical reactivity of the organic lithium salt. Since the HOMO energy of acetonitrile, which has been calculated based on DFT calculation, is −8.87 eV, it is suggested that the oxidation reactivity of the organic lithium salt of the present embodiment might be higher than that of acetonitrile. The LUMO energy and HOMO energy of the anion that are in the above described ranges are not only effective for the formation of a protective film on a negative electrode, but they also suppress nonelectrochemical side reactions. In addition, the reaction product is not strongly fixed only on a negative electrode, but in some form, it provides good effects on members other than the negative electrode, such as a positive electrode and a separator. As a result, an increase in internal resistance caused by repeating charge-discharge cycles can be suppressed.

Specific examples of the organic lithium salt whose anion having a LUMO energy in the range of −2.00 to 4.35 eV and a HOMO energy in the range of −5.35 to −2.90 eV include: organic lithium salts represented by $LiN(SO_2C_mF_{2m+1})_2$ [wherein m represents an integer from 1 to 8], such as $LiN(SO_2CF_3)_2$ (LUMO energy=2.99 eV, and HOMO energy=−4.14 eV) and $LiN(SO_2C_2F_5)_2$ (LUMO energy=3.02 eV, and HOMO energy=−4.35 eV); organic lithium salts represented by $LiPF_n(C_pF_{2p+1})_{6-n}$ [wherein n represents an integer from 1 to 5, and p represents an integer from 1 to 8], such as $LiPF_5(CF_3)$ (LUMO energy=3.78 eV, and HOMO energy=−5.06 eV); organic lithium salts represented by $LiBF_q(C_sF_{2s+1})_{4-q}$ [wherein q represents an integer from 1 to 3, and s represents an integer from 1 to 8], such as $LiBF_3(CF_3)$ (LUMO energy=3.73 eV, and HOMO energy=−4.11 eV); lithium bis(oxalato)borate (LiBOB) (LUMO energy=0.57 eV, and HOMO energy=−4.03 eV), represented by $LiB(C_2O_4)_2$, halogenated LiBOB; lithium difluoro(oxalato)borate (LiODFB) (LUMO energy=2.01 eV, and HOMO energy=−3.29 eV), represented by $LiBF_2(C_2O_4)$; lithium bis(malonate)borate (LiBMB) (LUMO energy=2.48 eV, and HOMO energy=−4.27 eV), represented by $LiB(C_3O_4H_2)_2$; and lithium tetrafluoro(oxalate)phosphate (LUMO energy=1.52 eV, and HOMO energy=−4.19 eV), represented by $LiPF_4(C_2O_4)$.

Moreover, organic lithium salts represented by the following general formulae (9a), (9b), and (9c) can also be used.

$$LiC(SO_2R^5)(SO_2R^6)(SO_2R^7) \quad (9a)$$

$$LiN(SO_2OR^8)(SO_2OR^9) \quad (9b)$$

$$LiN(SO_2R^{10})(SO_2OR^{11}) \quad (9c)$$

Herein, in the above formulae, $R^5$, $R^6$, $R^7$, $R^8$, $R^9$, $R^{10}$ and $R^{11}$ may be identical to or different from one another, and represent a perfluoroalkyl group containing 1 to 8 carbon atoms.

These organic lithium salts are used singly or in combination of two or more. In terms of structural stability, an organic lithium salt having a boron atom is preferable. In addition, in the case of an organic lithium salt having an organic ligand, the organic ligand is associated with an electrochemical reaction so as to form a protective film known as Solid Electrolyte Interface (SEI) on the surface of an electrode. Accordingly, from the viewpoint of the suppression of an increase in internal resistance, such an organic lithium salt having an organic ligand is preferable. As such organic lithium salts, specifically, LiBOB, halogenated LiBOB, LiODFB, and LiBMB are preferable, and further, LiBOB and LiODFB are particularly preferable.

The type of the anion of the organic lithium salt of the present embodiment is not particularly limited, as long as it has a LUMO energy and a HOMO energy that are in the above described ranges. In order for the product generated as a result of the reductive reaction not to be strongly fixed only on a negative electrode, but to, in some form, provide good effects on members other than the negative electrode, such as a positive electrode and a separator, the anion of the present organic lithium salt more preferably has a LUMO energy in the range of −1.00 to 2.70 eV and a HOMO energy in the range of −4.50 to −3.00 eV; and the anion of the present organic lithium salt further preferably has a LUMO energy in the range of 0.00 to 1.50 eV and a HOMO energy in the range of −4.40 to −3.50 eV.

The lithium salt is contained, preferably in a concentration of 0.1 to 3 mol/L, and more preferably in a concentration of 0.5 to 2 mol/L, in the non-aqueous electrolyte solution of the present embodiment. By adjusting the concentration of the lithium salt in this range, the conductivity of the electrolyte solution is kept high, and at the same time, the charge-discharge efficiency of the non-aqueous secondary battery is also kept high. Moreover, the content of the organic lithium salt is preferably 0.1 to 30 mass %, more preferably 0.5 to 25 mass %, and further preferably 1 to 20 mass %, based on the total amount of the non-aqueous electrolyte solution of the present embodiment. By adjusting the content of the organic lithium salt in this range, the balance between the function as an electrolyte solution and solubility can be maintained.

The non-aqueous electrolyte solution of the present embodiment may further contain an inorganic lithium salt. The type of such an inorganic lithium salt is not particularly limited, as long as it is used as an ordinary non-aqueous electrolyte, and all types of such inorganic lithium salts may be used herein. Specific examples of such an inorganic lithium salt include $LiPF_6$, $LiBF_4$, $LiClO_4$, $LiAsF_6$, $Li_2SiF_6$, $LiSbF_6$, $LiAlO_4$, $LiAlCl_4$, $Li_2B_{12}F_bH_{12-b}$ [wherein b represents an integer from 0 to 3], and lithium salts that bind to polyvalent anions.

These inorganic lithium salts are used singly or in combination of two or more. In particular, if a compound having a fluorine atom is used as an inorganic lithium salt, free ions promote the effect of SEI formation by the organic lithium salt and also form a passive film on the surface of a positive electrode collector foil. Accordingly, from the viewpoint of the suppression of an increase in internal resistance, such a compound having a fluorine atom is preferable. Furthermore, if a compound having a phosphorus atom is used as an inorganic lithium salt, free fluorine atoms are easily released. Thus, such a compound having a phosphorus atom is more preferable, and $LiPF_6$ is particularly preferable.

The content of the inorganic lithium salt is preferably 0.1 to 40 mass %, more preferably 0.2 to 10 mass %, and further preferably 0.5 to 5 mass %, based on the total amount of the non-aqueous electrolyte solution of the present embodiment. On the other hand, the inorganic lithium salt needs to be used to such an extent that it does not impair the effect of SEI formation by the organic lithium salt. Preferably, the molar quantity of the inorganic lithium salt does not exceed the molar quantity of the organic lithium salt contained. Specifically, it is preferable to satisfy the condition represented by the following formula (1):

$$0.05 \leq X \leq 1 \quad (1)$$

Herein, in the above formula (1), X represents a molar ratio of the inorganic lithium salt to the organic lithium salt contained in the non-aqueous electrolyte solution. By adjusting the molar ratio of the inorganic lithium salt to the organic lithium salt contained in the non-aqueous electrolyte solution in this range, both the function of the organic lithium salt and the function of the inorganic lithium salt can be achieved.

The non-aqueous electrolyte solution of the present embodiment may contain at least acetonitrile and an organic lithium salt. It may further contain a non-aqueous solvent other than acetonitrile, or a non-nitrile additive.

The type of such a non-aqueous solvent other than acetonitrile is not particularly limited. For example, the non-aqueous solvent may be an aprotic solvent, and an aprotic polar solvent is preferable. Specific examples of such a non-aqueous solvent include: cyclic carbonates including, as typical examples, ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, and cis-2,3-pentylene carbonate; lactones including, as typical examples, γ-butyrolactone and γ-valerolactone; sulfur compounds including dimethyl sulfoxide as a typical example; cyclic ethers including, as typical examples, tetrahydrofuran, 1,4-dioxane, and 1,3-dioxane; acyclic carbonates including, as typical examples, methyl ethyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate, and methyl trifluoroethyl carbonate; mononitriles such as propiononitrile, butyronitrile, valeronitrile, and acrylonitrile; alkoxy-substituted nitriles including, as typical examples, methoxy acetonitrile and 3-methoxy propionitrile; cyclic nitriles including benzonitrile as a typical example; ethers including dimethyl ether as a typical example; acyclic carboxylic esters including methyl propionate as a typical example; and acyclic ether carbonate compounds including dimethoxyethane as a typical example. In addition, examples of such a non-aqueous solvent also include halides including the fluorides of these compounds as typical examples. These compounds are used singly or in combination of two or more.

The non-nitrile additive of the present embodiment is not particularly limited, as long as it is a compound that does not inhibit the solution of the problem by the present invention and does not have a nitrile group. The present non-nitrile additive may substantially overlap with a substance that plays a role as a solvent that dissolves lithium salts, namely, the above described non-aqueous solvent. Moreover, the present non-nitrile additive is preferably a substance that contributes to the improvement of the performance of the non-aqueous electrolyte solution and non-aqueous secondary battery of the present embodiment. However, the non-nitrile additive includes substances that are not directly associated with electrochemical reactions, and they are used by a single use of one ingredient or by a combined use of two or more ingredients. From the viewpoint of the durability of SEI, the non-aqueous electrolyte solution of the present embodiment preferably contains two or more of the non-nitrile additives.

The non-nitrile additive preferably contains a compound having a LUMO energy that is in the range of −3.00 to 0.90 eV (hereinafter also referred to as a "specific additive"). The LUMO energy is more preferably from −2.10 to 0.80 eV, and further preferably from −2.00 to 0.60 eV. Since the reaction in which electrons enter the LUMO is a reductive reaction, the LUMO energy correlates with the reducibility of an additive. Thus, the lower the LUMO energy, the higher the reduction potential that can be obtained, and it means easy reducibility. Since the LUMO energy of acetonitrile calculated by the DFT calculation is 0.98 eV, the specific additive of the present embodiment is a compound that is reduced more sufficiently than acetonitrile, and this suggests that the electrochemical reaction progresses more quickly than the reductive decomposition of acetonitrile. By adjusting the LUMO energy of the specific additive in the above described range, it is not only effective for the formation of a protective film on a negative electrode, but it also suppresses nonelectrochemical side reactions caused by extremely high reducibility. Furthermore, differing from the case of an extremely low LUMO energy, the product generated as a result of the reductive reaction is not strongly fixed only on a negative electrode, but in some form, it provides good effects on members other than the negative electrode, such as a positive electrode and a separator. As a result, an increase in internal resistance caused by repeating charge-discharge cycles can be suppressed.

It is to be noted that the structural optimization and energy calculation of the non-nitrile additive are carried out using the formula B3LYP/6-31G*, as in the case of the organic lithium salt, with the exception that a diffuse function is not used. However, if the non-nitrile additive is a compound that shows high polarity as a result of the polarization effect by a negatively charged anion or a functional group, electron distribution is spread over a region apart from an atomic nucleus, in comparison with a neutral molecule. As a result, there is a case in which the calculation is not converged with B3LYP/6-31G*, or a case in which an imaginary frequency is obtained as a result of vibration analysis. In such a case, structural optimization and energy calculation are carried out using B3LYP/6-31+G*, in which a diffuse function is further used. Moreover, in the case of an open-shell configuration in which unpaired electrons are present, such as a transition metal complex, a UHF (spin-Unrestricted Hartree-Fock) method is applied to determine molecular orbital to individual spins, separately. A majority of organic compounds have a closed-shell configuration as an electron configuration, and thus, the molecular orbital of a spin is identical to that of β spin. Therefore, the RHF method is applied as in the case of the organic lithium salt.

Specific examples of the compound having a LUMO energy that is in the range of −3.00 to 0.90 eV (hereafter, in this paragraph, the numerical value in the parentheses indicates a LUMO energy) include: fluoroethylene carbonates including, as typical examples, 4-fluoro-1,3-dioxolan-2-one (0.52 eV), 4,4-difluoro-1,3-dioxolan-2-one (0.22 eV), cis-4,5-difluoro-1,3-dioxolan-2-one (0.08 eV), trans-4,5-difluoro-1,3-dioxolan-2-one (0.00 eV), 4,4,5-trifluoro-1,3-dioxolan-2-one (−0.27 eV), 4,4,5,5-tetrafluoro-1,3-dioxolan-2-one (−0.52 eV), and 4,4,5-trifluoro-5-methyl-1,3-dioxolan-2-one (−0.11 eV); unsaturated bond-containing cyclic carbonates including, as typical examples, vinylene carbonate (0.00 eV), 4,5-dimethylvinylene carbonate (0.44 eV), and vinyl ethylene carbonate (−0.52 eV); lactones including, as typical examples, γ-butyrolactone (0.33 eV), γ-valerolactone (0.38 eV), γ-caprolactone (0.38 eV), δ-valerolactone (0.30 eV), δ-caprolactone (0.35 eV), and ε-caprolactone (0.38 eV); cyclic ethers including 1,2-dioxane (0.84 eV) as a typical example; carboxylic esters including, as typical examples, methyl formate (0.14 eV), methyl acetate (0.35 eV), methyl propionate (0.41 eV), methyl butyrate (0.41 eV), ethyl formate (0.16 eV), ethyl acetate (0.41 eV), ethyl propionate (0.46 eV), ethyl butyrate (0.46 eV), n-propyl formate (0.19 eV), n-propyl acetate (0.44 eV), n-propyl propionate (0.49 eV), n-propyl butyrate (0.49 eV), isopropyl formate (0.24 eV), isopropyl acetate (0.44 eV), isopropyl propionate (0.49 eV), isopropyl butyrate (0.49 eV), n-butyl formate (0.19 eV), n-butyl acetate (0.44 eV), n-butyl propionate (0.49 eV), n-butyl butyrate (0.49 eV), isobutyl formate (0.22 eV), isobutyl acetate (0.41 eV), isobutyl propionate (0.46 eV), isobutyl butyrate (0.49 eV), sec-butyl formate (0.24 eV), sec-butyl acetate (0.46 eV), sec-butyl propionate (0.49 eV), sec-butyl butyrate (0.52 eV), tert-butyl formate (0.27 eV), tert-butyl acetate (0.46 eV), tert-butyl propionate (0.44 eV), tert-butyl butyrate (0.44 eV), methyl pivalate (0.41 eV), n-butyl pivalate (0.49 eV), n-hexyl pivalate (0.49 eV), n-octyl pivalate (0.49 eV), dimethyl oxalate (−1.58 eV), ethylmethyl oxalate (−1.52 eV), diethyl oxalate (−1.47 eV), diphenyl oxalate (−1.99 eV), malonic ester, fumaric ester, and maleic ester; amides including, as typical examples, N-methylformamide (0.90 eV), N,N-dimethylformamide (0.87 eV), and N,N-dimethylacetamide (0.90 eV); cyclic sulfur compounds including, as typical examples, ethylene sulfite (−0.60 eV), propylene sulfite (0.00 eV), butylene sulfite (−0.16 eV), pentene sulfite (0.14 eV), sulfolane (−0.30 eV), 3-methyl sulfolane (−0.33 eV), 3-sulfolene (−0.33 eV), 1,3-propane sultone (−0.33 eV), 1,4-butane sultone (−0.35 eV), 1,3-propanediol sulfate (0.68 eV), tetramethylene sulfoxide (−0.14 eV), and thiophene 1-oxide (−2.37 eV); aromatic compounds including, as typical examples, monofluorobenzene (−0.22 eV), biphenyl (−0.90 eV), and biphenyl fluoride (−2.07 eV); nitro compounds including nitromethane (−1.88 eV) as a typical example; Schiff bases; Schiff base complexes; and oxalato complexes. These compounds are used singly or in combination of two or more.

The HOMO (highest occupied molecular orbital) energy of the non-nitrile additive is not particularly limited. In order for the product generated as a result of the reductive reaction not to be strongly fixed only on a negative electrode, but to, in some form, provide good effects on members other than the negative electrode, such as a positive electrode and a separator, thereby suppressing an increase in internal resistance caused by repeating charge-discharge cycles, the HOMO energy is preferably in the range of −9.55 to −6.00 eV, more preferably in the range of −9.00 to −6.25 eV, and further preferably in the range of −8.50 to −7.25 eV.

Specific examples of the non-nitrile additive having a HOMO energy that is in the range of −9.55 to −6.00 eV (hereafter, in this paragraph, the numerical value in the parentheses indicates a HOMO energy) include: fluoroethylene carbonates including, as typical examples, 4-fluoro-1,3-dioxolan-2-one (−8.44 eV), 4,4-difluoro-1,3-dioxolan-2-one (−8.82 eV), cis-4,5-difluoro-1,3-dioxolan-2-one (−8.82 eV), trans-4,5-difluoro-1,3-dioxolan-2-one (−8.87 eV), 4,4,5-trifluoro-1,3-dioxolan-2-one (−9.17 eV), 4,4,5,5-tetrafluoro-1,3-dioxolan-2-one (−9.52 eV), and 4,4,5-trifluoro-5-methyl-1,3-dioxolan-2-one (−8.98 eV); unsaturated bond-containing cyclic carbonates including, as typical examples, vinylene carbonate (−6.91 eV), 4,5-dimethylvinylene carbonate (−6.34 eV), and vinylethylene carbonate (−7.73 eV); lactones including, as typical examples, γ-butyrolactone (−7.21 eV), γ-valerolactone (−7.13 eV), γ-caprolactone (−7.13 eV), δ-valerolactone (−7.02 eV), δ-caprolactone (−6.97 eV), and ε-caprolactone (−6.99 eV); cyclic ethers including 1,2-dioxane (−6.99 eV) as a typical example; carboxylic esters including, as typical examples, methyl formate (−7.70 eV), methyl acetate (−7.21 eV), methyl propionate (−7.18 eV), methyl butyrate (−7.18 eV), ethyl formate (−7.56 eV), ethyl acetate (−7.13 eV), ethyl propionate (−7.13 eV), ethyl butyrate (−7.10 eV), n-propyl formate (−7.54 eV), n-propyl acetate (−7.10 eV), n-propyl propionate (−7.10 eV), n-propyl butyrate (−7.10 eV), isopropyl formate (−7.48 eV), isopropyl acetate (−7.07 eV), isopropyl propionate (−7.07 eV), isopropyl butyrate (−7.05 eV), n-butyl formate (−7.54 eV), n-butyl acetate (−7.10 eV), n-butyl propionate (−7.10 eV), n-butyl butyrate (−7.07 eV), isobutyl formate (−7.54 eV), isobutyl acetate (−7.13 eV), isobutyl propionate (−7.13 eV), isobutyl butyrate (−7.10 eV), sec-butyl formate (−7.46 eV), sec-butyl acetate (−7.05 eV), sec-butyl propionate (−7.05 eV), sec-butyl butyrate (−7.05 eV), tert-butyl formate (−7.27 eV), tert-butyl acetate (−7.05 eV), tert-butyl propionate (−6.97 eV), tert-butyl butyrate (−6.94 eV), methyl pivalate (−7.16 eV), n-butyl pivalate (−7.05 eV), n-hexyl pivalate (−7.05 eV), n-octyl pivalate (−7.05 eV), dimethyl oxalate (−7.29 eV), ethylmethyl oxalate (−7.62 eV), diethyl oxalate (−7.16 eV), diphenyl oxalate (−6.69 eV), malonic ester, fumaric ester, and maleic ester; amides including, as typical examples, N-methylformamide (−6.80 eV), N,N-dimethylformamide (−6.59 eV), and N,N-dimethylacetamide (−6.34 eV); cyclic sulfur compounds including, as typical examples, ethylene sulfite (−7.73 eV), propylene sulfite (−7.29 eV), butylene sulfite (−7.10 eV), pentene sulfite (−7.07 eV), sulfolane (−7.84 eV), 3-methyl sulfolane (−7.78 eV), 3-sulfolene (−7.67 eV), 1,3-propane sultone (−8.30 eV), 1,4-butane sultone (−8.54 eV), 1,3-propanediol sulfate (−8.49 eV), tetramethylene sulfoxide (−6.26 eV), and thiophene 1-oxide (−6.64 eV); aromatic compounds including, as typical examples, monofluorobenzene (−6.61 eV) and biphenyl fluoride (−7.02 eV); and nitro compounds including nitromethane (−8.00 eV) as a typical example.

The content of the non-nitrile additive in the non-aqueous electrolyte solution of the present embodiment is not particularly limited. The content of the non-nitrile additive is preferably 0.1 to 30 mass %, and more preferably 0.1 to 10 mass %, based on the total amount of the non-aqueous electrolyte solution of the present embodiment. In the present embodiment, the non-nitrile additive contributes to the achievement of high cycling performance. On the other hand, the contribution of the non-nitrile additive to high-rate performance under a low temperature environment has not been confirmed. As the amount of the non-nitrile additive is increased, degradation of the electrolyte solution according to the present embodiment can be suppressed. At the same time, as the amount of the non-nitrile additive is decreased, high-rate characteristic under a low temperature environment can be improved. Accordingly, by adjusting the content of the non-nitrile additive in the above described range, the excellent performance of acetonitrile can be sufficiently exhibited without impairing a basic function as a non-aqueous secondary battery. By producing an electrolyte solution with this composition, all of the cycling performance of the electrolyte solution, high-rate performance under a low temperature environment, and other battery characteristics can be further improved.

The boiling point of the non-nitrile additive of the present embodiment is not particularly limited. The present non-nitrile additive is preferably a compound having a boiling point higher than that of acetonitrile. Since such a non-nitrile additive has a boiling point higher than that of acetonitrile and can be treated at an ordinary temperature in the form of a liquid or a solid, the addition of such an additive is already extremely easy, and at the same time, a practically extremely serious problem, such as pressurization inside a battery or the expansion of the battery caused by the volatilization of the non-nitrile additive, or in a case, the rupture of the battery, can be avoided.

The content of acetonitrile in the non-aqueous electrolyte solution of the present embodiment is not particularly limited. The content of acetonitrile is preferably 10 to 100 vol %, more preferably 70 to 100 vol %, and further preferably 90 to 100 vol %, based on the total amount of ingredients contained in the non-aqueous electrolyte solution, other than the organic lithium salt, and in a case in which the non-aqueous electrolyte solution contains an inorganic lithium salt, based on the total amount of ingredients contained in the non-aqueous electrolyte solution, other than the organic lithium salt or the inorganic lithium salt. By adjusting the content of acetonitrile in the above described range, the excellent performance of acetonitrile can be sufficiently exhibited without impairing a basic function as a non-aqueous secondary battery. As a result, all of the cycling performance of the electrolyte solution, high-rate performance under a low temperature environment, and other battery characteristics can be further improved.

In the present embodiment, from the viewpoint of the improvement of the durability of SEI, particularly in a case in which two or more non-nitrile additives are used in combination, the non-nitrile additives preferably comprise one or more compounds selected from the group consisting of carbonates, namely, compounds having $CO_3$ in its molecule. In addition, the carbonates are preferably organic carbonates, more preferably cyclic carbonates, and further preferably compounds having a carbon-carbon double bond. In particular, in a case in which the non-nitrile additives contain vinylene carbonate as a main ingredient, namely, in a case in which the non-nitrile additives contain vinylene carbonate in the largest amount, the durability of SEI is significantly improved, when compared with a case in which such vinylene carbonate is used alone. This may be because such carbonates easily undergo a copolymeric decomposition reaction, that is, they easily form copolymers with other non-nitrile additives, so that the flexibility or difficult solubility of SEI can be enhanced. However, the factors are not limited thereto.

In the present embodiment, from the viewpoint of the improvement of the durability of SEI, particularly in a case in which two or more non-nitrile additives are used in combination, the non-nitrile additives preferably comprise one or more compounds selected from the group consisting of compounds represented by the following formula (2) (hereinafter referred to as "Compound (2)"):

$$R^1\text{-}A\text{-}R^2 \quad (2)$$

Herein, in the above formula (2), $R^1$ and $R^2$ each independently represent an alkyl group optionally substituted with an aryl group or a halogen atom or an aryl group optionally substituted with an alkyl group or a halogen atom, or $R^1$ and $R^2$ bind to each other, together with A, to form a cyclic structure optionally having an unsaturated bond; and A represents a divalent group having a structure represented by any one of the following formulae (3) to (7):

[Formula 2]

(3)

(4)

(5)

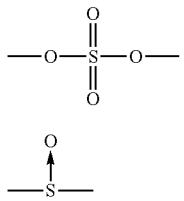

The alkyl group optionally substituted with an aryl group or a halogen atom, which may be represented by $R^1$ and $R^2$, is preferably an alkyl group containing 1 to 4 carbon atoms that is optionally substituted with an aryl group or a halogen atom, and more preferably an alkyl group containing 1 to 4 carbon atoms that is optionally substituted with a phenyl group or a halogen atom. Specific examples of such an alkyl group include a methyl group, an ethyl group, a propyl group, an isopropyl group, and a butyl group. In addition, examples of an aryl group serving as a substituent include a phenyl group, a naphthyl group, and an anthranil group. Of these groups, a phenyl group is preferable. As a halogen atom serving as a substituent for the alkyl group, a fluorine atom, a chlorine atom, and a bromine atom are preferable. The alkyl group may be optionally substituted with a plurality of these substituents, and it may be optionally substituted with both an aryl group and a halogen atom.

The aryl group optionally substituted with an alkyl group or halogen atom, which may be represented by $R^1$ and $R^2$, preferably includes a phenyl group optionally substituted with an alkyl group or a halogen atom, a naphthyl group, and an anthranil group. It is more preferably a phenyl group optionally substituted with an alkyl group or a halogen atom, and further preferably a phenyl group optionally substituted with a halogen atom. Examples of the aryl group include a phenyl group, a naphthyl group, and an anthranil group. Of these groups, a phenyl group is preferable. In addition, the alkyl group serving as a substituent for the aryl group is preferably an alkyl group containing 1 to 4 carbon atoms. Examples of such an alkyl group include a methyl group, an ethyl group, a propyl group, an isopropyl group, and a butyl group. The halogen atom serving as a substituent for the aryl group preferably includes a fluorine atom, a chlorine atom, and a bromine atom. The aryl group may be optionally substituted with a plurality of these substituents, and it may be optionally substituted with both an alkyl group and a halogen atom.

The cyclic structure that is formed by the binding of $R^1$ to $R^2$, together with A, is preferably a 4 or more membered ring, and it may optionally have any one or more of double bonds and triple bonds. $R^1$ and $R^2$ that bind to each other, each preferably represent a divalent hydrocarbon group, and the number of carbon atoms contained therein is preferably 1 to 6. Specific examples include —$CH_2$—, —$CH_2CH_2$—, —$CH_2CH_2CH_2$—, —$CH_2CH_2CH_2CH_2$—, —$CH_2CH_2CH_2CH_2CH_2$—, —CH=CH—, —CH=CH$CH_2$—, —CH=CH$CH_2CH_2$—, —$CH_2$CH=CH$CH_2$—, and —$CH_2CH_2$C=CC$H_2CH_2$—. Moreover, one or more hydrogen atoms possessed by these groups may be optionally replaced by any one or more of alkyl groups (e.g. a methyl group and an ethyl group), halogen atoms (e.g. a fluorine atom, a chlorine atom, and a bromine atom), and aryl groups (e.g. a phenyl group). $R^1$ and $R^2$ may be identical to or different from each other.

Specific examples of the Compound (2), wherein A is a divalent group having the structure represented by the above formula (3), include: acyclic sulfites such as dimethyl sulfite, diethyl sulfite, ethyl methyl sulfite, methyl propyl sulfite, ethyl propyl sulfite, diphenyl sulfite, methyl phenyl sulfite, ethyl sulfite, dibenzyl sulfite, benzyl methyl sulfite, and benzyl ethyl sulfite; cyclic sulfites such as ethylene sulfite, propylene sulfite, butylene sulfite, pentene sulfite, vinylene sulfite, phenylethylene sulfite, 1-methyl-2-phenylethylene sulfite, and 1-ethyl-2-phenylethylene sulfite; and halides of the above described acyclic sulfites and cyclic sulfites.

Specific examples of the Compound (2), wherein A is a divalent group having the structure represented by the above formula (4), include: acyclic sulfones such as dimethyl sulfone, diethyl sulfone, ethylmethyl sulfone, methylpropyl sulfone, ethylpropyl sulfone, diphenyl sulfone, methylphenyl sulfone, ethylphenyl sulfone, dibenzyl sulfone, benzyl methyl sulfone, and benzyl ethyl sulfone; cyclic sulfones such as sulfolane, 2-methyl sulfolane, 3-methyl sulfolane, 2-ethyl sulfolane, 3-ethyl sulfolane, 2,4-dimethyl sulfolane, 3-sulfolene, 3-methylsulfolene, 2-phenyl sulfolane, and 3-phenyl sulfolane; and halides of the above described acyclic sulfones and cyclic sulfones.

Specific examples of the Compound (2), wherein A is a divalent group having the structure represented by the above formula (5), include: acyclic sulfonates such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, benzyl methanesulfonate, benzyl ethanesulfonate, and benzyl propanesulfonate; cyclic sulfonates such as 1,3-propane sultone, 1,4-butane sultone, 3-phenyl-1,3-propane sultone, and 4-phenyl-1,4-butane sultone; and halides of the above described acyclic sulfonates and cyclic sulfonates.

Specific examples of the Compound (2), wherein A is a divalent group having the structure represented by the above formula (6), include: acyclic sulfates such as dimethyl sulfate, diethyl sulfate, ethyl methyl sulfate, methyl propyl sulfate, ethyl propyl sulfate, methyl phenyl sulfate, ethyl phenyl sulfate, phenyl propyl sulfate, benzyl methyl sulfate, and benzyl ethyl sulfate; cyclic sulfates such as ethylene glycol sulfate, 1,2-propanediol sulfate, 1,3-propanediol sulfate, 1,2-butanediol sulfate, 1,3-butanediol sulfate, 2,3-butanediol sulfate, phenylethylene glycol sulfate, methylphenylethylene glycol sulfate, and ethylphenylethylene glycol sulfate; and halides of the above described acyclic sulfates and cyclic sulfates.

Specific examples of the Compound (2), wherein A is a divalent group having the structure represented by the above formula (7), include: acyclic sulfoxides such as dimethyl sulfoxide, diethyl sulfoxide, ethylmethyl sulfoxide, methylpropyl sulfoxide, ethylpropyl sulfoxide, diphenyl sulfoxide, methylphenyl sulfoxide, ethylphenyl sulfoxide, dibenzyl sulfoxide, benzyl methyl sulfoxide, and benzyl ethyl sulfoxide; cyclic sulfoxides such as tetramethylene sulfoxide and thiophene 1-oxide; and halides of the above described acyclic sulfoxides and cyclic sulfoxides.

The Compounds (2) are used singly or in combination of two or more. When two or more Compounds (2) are used in combination, the structures of A in individual Compounds (2) may be identical to or different from one another.

The content of the Compound (2) in the non-aqueous electrolyte solution is not particularly limited. The content of the Compound (2) is preferably 0.05 to 30 vol %, more preferably 0.1 to 20 vol %, and further preferably 0.5 to 10 vol %, based on the total amount of ingredients contained in the non-aqueous electrolyte solution, other than the organic lithium salt, and further, in a case in which the non-aqueous electrolyte solution contains an inorganic lithium salt, based on the total amount of ingredients contained in the non-aqueous electrolyte solution, other than the organic lithium salt or the inorganic lithium salt. The Compound (2) includes a compound that is in the state of a solid at a room temperature (25° C.). Such a compound may be used in the range of its saturation in acetonitrile or less, preferably at 60% by mass or less of the saturation, and more preferably at 30% by mass or less of the saturation. By adjusting the content of the Compound (2) in the above described range, significant effects can be obtained by the combined use of two or more of the non-nitrile additives of the present embodiment, and the durability of SEI can be significantly improved in comparison with the use of a single type of the non-nitrile additive of the present embodiment.

When the Compound (2) is used as an ingredient of the non-nitrile additive, it plays a role as a comonomer in a polymeric decomposition reaction. Thus, addition of the Compound (2) is considered to contribute to the significant improvement of the durability of SEI. However, factors for the improvement of the durability of SEI are not limited thereto. When such a reaction mechanism is assumed, the Compound (2) preferably forms a cyclic structure from the viewpoint of ring-opening polymerization. In particular, by adding one or more compounds selected from the group consisting of ethylene sulfite, propylene sulfite, butylene sulfite, pentene sulfite, sulfolane, 3-methyl sulfolane, 3-sulfolene, 1,3-propane sultone, 1,4-butane sultone, 1,3-propanediol sulfate, and tetramethylene sulfoxide, as an ingredient(s) of the non-nitrile additive, it becomes possible for the non-aqueous electrolyte solution of the present embodiment to continuously exhibit higher performance even under a severe use environment, such as high-temperature charge and discharge, or charging storage.

The non-aqueous electrolyte solution of the present embodiment may further contain a dinitrile compound, namely, a compound having two nitrile groups in its molecule. The dinitrile compound has the effect of reducing the corrosion of the metallic portion of a battery can, an electrode, etc. This is because, with the use of a dinitrile compound, a protective film for suppressing corrosion is formed on the surface of a metallic portion with reduced corrosion. However, factors for the reduction of the corrosion of such a metallic portion are not limited thereto.

The type of such a dinitrile compound is not particularly limited, as long as it does not inhibit the solution of the problem by the present invention. The dinitrile compound is preferably a compound having a methylene chain, and more preferably a compound having a methylene chain containing 2 to 12 carbon atoms. The dinitrile compound may be either a linear or branched dinitrile compound. Examples of the dinitrile compound include: linear dinitrile compounds such as succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,11-dicyanoundecane, and 1,12-dicyanododecane; branched dinitrile compounds such as tetramethyl succinonitrile, 2-methyl glutaronitrile, 2,4-dimethyl glutaronitrile, 2,2,4,4-tetramethyl glutaronitrile, 1,4-dicyanopentane, 2,5-dimethyl-2,5-hexane dicarbonitrile, 2,6-dicyanoheptane, 2,7-dicyanooctane, 2,8-dicyanononane, and 1,6-dicyanodecane; and aromatic dinitrile compounds such as 1,2-dicyanobenzene, 1,3-dicyanobenzene, and 1,4-dicyanobenzene. These dinitrile compounds are used singly or in combination of two or more.

The content of the dinitrile compound in the non-aqueous electrolyte solution of the present embodiment is not particularly limited. It is preferably 0.01 to 1 mol/L, more preferably 0.02 to 0.5 mol/L, and further preferably 0.05 to 0.3 mol/L, based on the total amount of ingredients contained in the non-aqueous electrolyte solution, other than the organic lithium salt, and further, in a case in which the non-aqueous electrolyte solution contains an inorganic lithium salt, based on the total amount of ingredients contained in the non-aqueous electrolyte solution, other than the organic lithium salt or the inorganic lithium salt. By adjusting the content of the dinitrile compound in the above described range, cycling performance can be further improved without impairing a basic function as a non-aqueous secondary battery.

It is to be noted that such a dinitrile compound tends to have a low dipole moment when it has an even number of methylene chains. However, unexpectedly, it has been experimentally confirmed that a dinitrile compound having an even number of methylene chains has a higher additive effect than a dinitrile compound having an odd number of methylene chains. Accordingly, the dinitrile compound preferably contains one or more compounds selected from the group consisting of compounds represented by the following general formula (8):

$$NC-(CR^3R^4)_{2a}-CN \qquad (8)$$

Herein, in the above formula (8), $R^3$ and $R^4$ each independently represent a hydrogen atom or an alkyl group, and a represents an integer from 1 to 6. The alkyl group preferably contains 1 to 10 carbon atoms.

The non-aqueous electrolyte solution of the present embodiment may further contain an ionic compound. The ionic compound means a salt formed from organic cationic species other than lithium ions and anionic species. When the ionic compound is added to the non-aqueous electrolyte solution of the present embodiment, it exhibits the effect of further suppressing an increase in the internal resistance of a battery.

Examples of the cation of an ionic compound include: quaternary ammonium cations such as tetraethyl ammonium, tetrabutyl ammonium, triethyl methyl ammonium, trimethyl ethyl ammonium, dimethyl diethyl ammonium, trimethyl propyl ammonium, trimethyl butyl ammonium, trimethyl pentyl ammonium, trimethyl hexyl ammonium, trimethyl octyl ammonium, and diethyl methyl methoxy ethyl ammonium; imidazolium cations such as 1-ethyl-3-methyl imidazolium, 1-butyl-3-methyl imidazolium, 1,2-dimethyl-3-propyl imidazolium, 1-hexyl-3-methyl imidazolium, 1-ethyl-2,3-dimethyl imidazolium, and 1-methyl-3-propyl imidazolium; pyridinium cations such as 1-ethyl pyridinium, 1-butyl pyridinium, and 1-hexyl pyridinium; piperidinium cations such as 1-methyl-1-propyl piperidinium and 1-butyl-1-methyl piperidinium; pyrrolidinium cations such as 1-ethyl-1-methylpyrrolidinium, 1-methyl-1-propyl pyrrolidinium, and 1-butyl-1-methylpyrrolidinium; sulfonium cations such as diethylmethyl sulfonium and triethyl sulfonium; and quaternary phosphonium cations. Among these cations, cations having a nitrogen atom are preferable, and pyridinium cations are more preferable, from the viewpoint of electrochemical stability.

The anion of an ionic compound may be an anion that is generally adopted as a counterion of the above described cation. Examples of such an anion include $BF_4^-$, $PF_6^-$, $N(SO_2CF_3)_2^-$, $N(SO_2C_2F_5)_2^-$, and $SO_3CF_3$. Among these anions, $PF_6^-$ is preferable because it is excellent in terms of ionic dissociation and the suppression of an increase in internal resistance.

The non-aqueous electrolyte solution of the present embodiment preferably does not contain water. However, it may contain a trace amount of water, as long as it does not inhibit the solution of the problem by the present invention. The content of such water may be 0 to 100 ppm based on the total content of the electrolyte solution.

<Positive Electrode>

The type of a positive electrode used herein is not particularly limited, as long as it acts as a positive electrode of a non-aqueous secondary battery. A known positive electrode may also be used herein. The positive electrode preferably contains, as positive-electrode active materials, one or more materials selected from the group consisting of materials capable of doping and dedoping lithium ions. Examples of such a material include complex oxides represented by general formulae (10a) and (10b) as shown below, metal chalcogenides having a tunnel structure and a layer structure, and metal oxides.

$$Li_xMO_2 \tag{10a}$$

$$Li_yM_2O_4 \tag{10b}$$

Herein, in the above formulae, M represents one or more metals selected from transition metals, x represents a number of 0 to 1, and y represents a number of 0 to 2.

More specific examples of the above described material include: lithium cobalt oxides including $LiCoO_2$ as a typical example; lithium manganese oxides including, as typical examples, $LiMnO_2$, $LiMn_2O_4$, and $Li_2Mn_2O_4$; lithium nickel oxides including $LiNiO_2$ as a typical example; lithium-containing complex metal oxides represented by $Li_zMO_2$ (wherein M represents two or more elements selected from the group consisting of Ni, Mn, Co, Al and Mg, and z represents a number of greater than 0.9 and less than 1.2); and olivine iron phosphate represented by $LiFePO_4$. Examples of the positive-electrode active material also includes oxides of metals other than lithium, such as S, $MnO_2$, $FeO_2$, $FeS_2$, $V_2O_5$, $V_6O_{13}$, $TiO_2$, $TiS_2$, $MoS_2$ and $NbSe_2$ as typical examples. More examples include conductive polymers such as polyaniline, polythiophene, polyacetylene and polypyrrole as typical examples.

When a lithium-containing compound is used as such a positive-electrode active material, it preferably tends to obtain high voltage and high energy density. The lithium-containing compound may be a compound that contains lithium. Examples of the lithium-containing compound include a complex oxide containing lithium and a transition metal element, a phosphate compound containing lithium and a transition metal element, and a metal silicate compound containing lithium and a transition metal element (for example, $Li_tM_uSiO_4$, wherein M has the same definitions as those in the above formula (10a), t represents a number of 0 to 1, and u represents a number of 0 to 2). From the viewpoint of the achievement of a higher voltage, a complex oxide and a phosphate compound, both of which contain lithium and one or more transition metal elements selected from the group consisting of cobalt (Co), nickel (Ni), manganese (Mn), iron (Fe), copper (Cu), zinc (Zn), chromium (Cr), vanadium (V), and titanium (Ti), are preferable.

More specifically, a metal oxide having lithium, a metal chalcogenide having lithium, and a phosphate metal compound having lithium are preferable as such lithium-containing compounds. Examples of such lithium-containing compounds include those represented by general formulae (11a) and (11b) as shown below. Among these compounds, a metal oxide having lithium and a metal chalcogenide having lithium are more preferable.

$$Li_vM^IO_2 \tag{11a}$$

$$Li_wM^{II}PO_4 \tag{11b}$$

Herein, in the above formulae, $M^I$ and $M^{II}$ each represent one or more transition metal elements. The values of v and w are different depending on the charge-discharge state of a battery, but in general, v represents a number of 0.05 to 1.10, and w represents a number of 0.05 to 1.10.

The compound represented by the above general formula (11a) generally has a layer structure, whereas the compound represented by the above general formula (11b) generally has an olivine structure. For the purpose of stabilizing the structures of these compounds, there may also be used compounds, in which several transition metal elements are replaced by Al, Mg or other transition metal elements, or are added to the crystalline interface thereof, or several oxygen atoms are replaced by fluorine atoms and the like. Further, there may also be used compounds, in which at least a part of the surface of the positive-electrode active material is coated with another positive-electrode active material.

The positive-electrode active materials are used singly or in combination of two or more.

The positive-electrode active material has a number-average particle diameter (primary particle diameter) of, preferably 0.05 µm to 100 µm, and more preferably 1 µm to 10 µm. The number-average particle diameter of the positive-electrode active material can be measured using a wet-type particle size analyzer (for example, a laser diffraction/scattering particle-size distribution analyzer, or a dynamic light scattering particle-size distribution analyzer). Alternatively, the number-average particle diameter can also be measured by randomly extracting 100 particles that have been observed under a transmission electron microscope, then analyzing the particles using image analysis software (for example, image analysis software manufactured by Asahi Kasei Engineering Corporation; trade name: "A-zou kun"), and then calculating an arithmetic average of the obtained values. In this case, if the number-average particle diameter of a single sample varies depending on measurement methods, a calibration curve produced by targeting to a standard sample may be used.

The positive electrode can be produced as follows, for example. That is, a positive electrode mixture prepared by mixing, as necessary, a conductive aid, a binder and the like into the above described positive-electrode active material, is firstly dispersed in a solvent, so as to prepare a positive electrode mixture-containing paste. Subsequently, this positive electrode mixture-containing paste is applied onto a positive electrode current collector, and it is then dried to form a positive electrode mixture layer. The thus formed positive electrode mixture layer is pressurized to adjust its thickness, as necessary, so as to produce a positive electrode.

Herein, the concentration of a solid in the positive electrode mixture-containing paste is preferably 30% to 80% by mass, and more preferably 40% to 70% by mass.

The positive electrode current collector is constituted with a metallic foil such as an aluminum foil or a stainless steel foil.

<Negative Electrode>

The type of a negative electrode used herein is not particularly limited, as long as it acts as a negative electrode of a non-aqueous secondary battery. A known negative electrode may also be used herein. The negative electrode preferably contains, as negative-electrode active materials, one or more materials selected from the group consisting of materials capable of doping and dedoping lithium ions and metallic lithium. Other than metallic lithium, examples of such materials include carbon materials including, as typical examples, amorphous carbon (hard carbon), artificial graphite, natural graphite, graphite, pyrolytic carbon, coke, glass carbon, a burned body of organic polymer compound, mesocarbon microbead, carbon fiber, activated carbon, graphite, colloidal carbon, and carbon black. Among these materials, examples of the coke include pitch coke, needle coke, and petroleum coke. In addition, the burned body of organic polymer compound is prepared by burning a polymer material such as a phenol resin or furan resin at a suitable temperature, followed by carbonization. The carbon material may contain a heterogeneous compound such as O, B, P, N, S, SiC or $B_4C$, as well as carbon. The content of such a heterogeneous compound is preferably 0 to 10 mass % based on the total amount of the carbon material. It is to be noted that, in the present embodiment, the non-aqueous secondary battery includes a battery in which metallic lithium is adopted as a negative-electrode active material.

Further, the material capable of doping and dedoping lithium ions also includes a material comprising an element capable of forming an alloy with lithium. This material may be a single body of metal or semimetal, an alloy, or a compound. In addition, it may also be a material having one or two or more phases of the above described compounds in at least a portion thereof.

It is to be noted that the term "alloy" is used in the present specification to include an alloy having one or more metal elements and one or more metalloid elements, as well as an alloy consisting of two or more metal elements. Moreover, if an alloy entirely has the properties of metal, it may also have a non-metal element. In the tissues of such an alloy, a solid solution, a eutectic (a eutectic mixture), an intermetallic compound, or two or more thereof coexist.

Examples of such a metal element and a metalloid element include titanium (Ti), tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among these elements, the metal elements and metalloid elements of Group 4 and Group 14 in the periodic table are preferable. Among them, titanium, silicon, and tin are particularly preferable because these elements have a great capacity for doping and dedoping lithium and achieve high energy density.

An example of a tin alloy is an alloy having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony, and chromium (Cr).

An example of a silicon alloy is an alloy having, as a second constituent element other than silicon, one or more elements selected from the group consisting of tin, magnesium, nickel, copper, iron, cobalt, manganese, zinc, indium, silver, titanium, germanium, bismuth, antimony, and chromium.

Examples of a titanium compound, a tin compound, and a silicon compound include compounds having oxygen (O) or carbon (C). These compounds may also have the above described second constituent element, as well as titanium, tin, or silicon.

The negative electrode may contain, as a negative-electrode active material, a metal compound capable of doping lithium ions in the range of 0.4 to 3 V vs. Li/Li$^+$. Examples of such a metal compound include a metal oxide, a metal sulfide, and a metal nitride.

Examples of such a metal oxide include titanium oxide, lithium titanium oxide (a lithium titanium-containing complex oxide), tungsten oxide (e.g. $WO_3$), amorphous tin oxide (e.g. $SnB_{0.4}P_{0.6}O_{3.1}$), tin silicon oxide (e.g. $SnSiO_3$), and silicon oxide (SiO). Among these metal oxides, titanium oxide and lithium titanium oxide are preferable.

Examples of the lithium titanium oxide include lithium titanate having a spinel structure {e.g. $Li_{4+a}Ti_5O_{12}$ (wherein a may be changed in the range of $-1 \leq a \leq 3$ by a charge-discharge reaction)}, and lithium titanate having a ramsdellite structure {e.g. $Li_{2+b}Ti_3O_7$ (wherein b may be changed in the range of $-1 \leq b \leq 3$ by a charge-discharge reaction)}.

As such a titanium oxide, either a titanium oxide containing Li even before charge and discharge, or a titanium oxide that does not contain Li before charge and discharge, may be used. Examples of the titanium oxide that does not contain Li before charge and discharge, namely during synthesis, include a titanium oxide (e.g. $TiO_2$, $H_2Ti_{12}O_{25}$), and a titanium complex oxide containing Ti and at least one element selected from the group consisting of P, V, Sn, Cu, Ni and Fe. As $TiO_2$, anatase-type $TiO_2$ having low crystallinity, the heat treatment temperature of which is 300° C. to 500° C., is preferable. Examples of the titanium complex oxide include $TiO_2$—$P_2O_5$, $TiO_2$—$V_2O_5$, $TiO_2$—$P_2O_5$—$SnO_2$, and $TiO_2$—$P_2O_5$-MeO (wherein Me is at least one element selected from the group consisting of Cu, Ni and Fe). Preferably, the titanium complex oxide has low crystallinity and also has a microstructure in which a crystal phase and an amorphous phase coexist, or in which an amorphous phase is present alone. By adopting such a microstructure, cycling performance can be significantly improved.

An example of the titanium oxide containing Li even before charge and discharge, namely, during synthesis, is $Li_cTiO_2$ (wherein c is $0 \leq c \leq 1.1$).

Examples of the metal sulfide include titanium sulfide (e.g. $TiS_2$), molybdenum sulfide (e.g. $MoS_2$), and iron sulfide (e.g. FeS, $FeS_2$, and $Li_gFeS_2$ (wherein g is $0 \leq g \leq 1$)). An example of the metal nitride is lithium cobalt nitride (e.g. $Li_dCo_eN$, wherein $0<d<4$ and $0<e<0.5$).

The non-aqueous electrolyte solution of the present embodiment effectively suppresses the reductive decomposition of acetonitrile in a negative electrode, and the negative-electrode active material used in the negative electrode is not particularly limited. From the viewpoint of the enhancement of the voltage of a battery, the negative electrode preferably contains, as a negative-electrode active material(s), a material(s) capable of doping lithium ions at a potential lower than 0.4 V vs. Li/Li$^+$. Examples of such a material(s) include: carbon materials including, as typical examples, amorphous carbon (hard carbon), artificial graphite, natural graphite, graphite, pyrolytic carbon, coke, glass carbon, a burned body of organic polymer compound, mesocarbon microbead, carbon fiber, activated carbon, graphite, colloidal carbon, and carbon black; metallic lithium; metal oxides; metal nitrides; lithium alloys; tin alloys; silicon alloys; intermetallic compounds; organic compounds; inorganic compounds; metal complexes; and organic polymer compounds.

The negative-electrode active materials are used singly or in combination of two or more.

The negative-electrode active material has a number-average particle diameter (primary particle diameter) of, preferably 0.1 μm to 100 μm, and more preferably 1 μm to 10 μm. The number-average particle diameter of the negative-electrode active material can be measured in the same manner as for the number-average particle diameter of the positive-electrode active material.

The negative electrode can be produced as follows, for example. That is, a negative electrode mixture prepared by mixing, as necessary, a conductive aid, a binder and the like into the above described negative-electrode active material, is firstly dispersed in a solvent, so as to prepare a negative electrode mixture-containing paste. Subsequently, this negative electrode mixture-containing paste is applied onto a negative electrode current collector, and it is then dried to form a negative electrode mixture layer. The thus formed negative electrode mixture layer is pressurized to adjust its thickness, as necessary, so as to produce a negative electrode.

Herein, the concentration of a solid in the negative electrode mixture-containing paste is preferably 30% to 80% by mass, and more preferably 40% to 70% by mass.

The negative electrode current collector is constituted with a metallic foil such as a copper foil, a nickel foil, or a stainless steel foil.

Examples of the conductive aid that is used, as necessary, for the production of a positive electrode and a negative electrode, include graphite, carbon black including, as typical examples, acetylene black and ketjen black, and carbon fiber. The conductive aid has a number-average particle diameter (primary particle diameter) of, preferably 0.1 μm to 100 μm, and more preferably 1 μm to 10 μm. The number-average particle diameter of the conductive aid can be measured in the same manner as for the number-average particle diameter of the positive-electrode active material. Examples of the binder include PVDF, PTFE, polyacrylic acid, styrene-butadiene rubber, and fluorocarbon rubber.

<Separator>

From the viewpoint of preventing a short circuit between positive and negative electrodes and ensuring safety such as shutdown, the non-aqueous secondary battery according to the present invention preferably comprises a separator between the positive electrode and the negative electrode. The separator may be the same as that used in known non-aqueous secondary batteries, and an insulative thin-film separator having high ion permeability and excellent mechanical strength is preferable. Examples of such a separator include woven fabric, non-woven fabric, and a microporous film made of synthetic resin. Among these materials, a microporous film made of synthetic resin is preferable. Examples of such a microporous film made of synthetic resin that is preferably used herein include a microporous film containing, as a main ingredient, polyethylene or polypropylene, and a polyolefin microporous film such as a microporous film containing polyolefin as well as the aforementioned material. Examples of such a non-woven fabric include porous films that are made of heat-resistant resins such as ceramic, polyolefin, polyester, polyamide, liquid crystalline polyester, and aramid.

The separator may be formed from a single layer of, or several layers of microporous film(s) of single type. Otherwise, the separator may be formed by laminating two or more microporous films.

<Method for Producing Battery>

The non-aqueous secondary battery of the present embodiment is produced by a known method using the above described non-aqueous electrolyte solution, positive electrode, negative electrode, and as necessary, separator. For example, a positive electrode and a negative electrode are wound in a laminated state in which a separator is intervened between the electrodes, so as to mold them to a laminated body having a winding structure. Otherwise, these electrodes are bended or a plurality of layers are laminated, so as to mold them to a laminated body, in which separators are intervened among a plurality of positive electrodes and negative electrodes that are alternatively laminated. Subsequently, the thus formed laminated body is placed into a battery case (outer package), and the electrolyte solution according to the present embodiment is then poured into the case, so that the laminated body is immersed in the electrolyte solution. Thereafter, the package is sealed, so as to produce the non-aqueous secondary battery of the present embodiment. Alternatively, an electrolyte film comprising a gelated electrolyte solution has previously been prepared, and thereafter, a laminated body is formed by bending or lamination of a positive electrode, a negative electrode, the electrolyte film, and as necessary, a separator, as described above. Thereafter, the formed laminated body is placed into a battery case, so as to produce a non-aqueous secondary battery. The form of the non-aqueous secondary battery of the present embodiment is not particularly limited. For example, a cylindrical form, an elliptical form, a prismatic form, a button form, a coin form, a planiform, and a laminate form are preferably adopted.

The non-aqueous secondary battery of the present embodiment can function as a battery as a result of the initial charge. The present non-aqueous secondary battery is stabilized by decomposition of a portion of the electrolyte solution during the initial charge. The method of initial charge of the present embodiment is not particularly limited. The initial charge is carried out preferably at 0.001 to 0.3 C, more preferably 0.002 to 0.25 C, and particularly preferably 0.003 to 0.2 C. In addition, the initial charge that is carried out via constant-voltage charge brings on preferable results. It is to be noted that a constant current that discharges a rated capacity for 1 hour is 1 C. By designing a long voltage range in which lithium salts are involved in the electrochemical reaction, SEI is formed on the surface of an electrode, so that the effect of suppressing an increase in internal resistance including a positive electrode can be obtained. Moreover, since the reaction product is not strongly fixed only on a negative electrode, but in some form, it provides good effects on members other than the negative electrode, such as a positive electrode and a separator, it is extremely effective to carry out initial charge, while considering the electrochemical reaction of lithium salts dissolved in acetonitrile.

According to the present embodiment, there can be provided a non-aqueous electrolyte solution that realizes a non-aqueous secondary battery having high-rate performance, and such a non-aqueous secondary battery. In addition, according to the present embodiment, the non-aqueous secondary battery is able to have high cycling performance and also, high-rate performance under a low temperature environment.

The embodiment for carrying out the present invention has been described above. However, the present invention is not limited to the above described embodiment. The present invention may be modified in various ways in the range in which it does not depart from the gist thereof.

EXAMPLES

Hereinafter, the present invention will be described more in detail in the following examples. However, these examples are not intended to limit the scope of the present invention. It is to be noted that various properties of the non-aqueous electrolyte solution and the non-aqueous secondary battery were measured and evaluated as follows. The charge and discharge of the non-aqueous secondary battery were measured and evaluated using a charging-releasing device ACD-01 (trade name) manufactured by Aska Electronic Co., Ltd., and a thermostat PLM-63S (trade name) manufactured by FUTABA Co., Ltd.

<Lithium Salt>

The types of lithium salts used in Examples and Comparative Examples, and their LUMO energy and HOMO energy, which were obtained by the above described calculation methods, are shown in L1 to L9 in Table 1.

TABLE 1

| No. | | LUMO [eV] | HOMO [eV] |
|---|---|---|---|
| | Organic lithium salt | | |
| L1 | LiBOB | 1.28 | −4.38 |
| L2 | LiN(SO$_2$CF$_3$)$_2$ | 3.02 | −4.35 |
| L3 | LiOSO$_2$CF$_3$ | 3.78 | −2.88 |
| L4 | LiN(SO$_2$C$_2$F$_5$)$_2$ | 2.72 | −4.24 |
| L5 | LiODFB | 2.15 | −3.59 |
| L6 | LiPF$_4$(C$_2$O$_4$) | 1.52 | −4.19 |
| | Inorganic lithium salt | | |
| L7 | LiPF$_6$ | 4.05 | −5.39 |
| L8 | LiBF$_4$ | 4.38 | −4.52 |
| L9 | LiAsF$_6$ | 3.16 | −5.74 |

<Additive>

The types of additives used in Examples and Comparative Examples, and their LUMO energy and HOMO energy, which were obtained by the above described calculation methods, are shown in A1 to A20 in Table 2.

TABLE 2

| No. | Additive | LUMO [eV] | HOMO [eV] |
|---|---|---|---|
| A1 | 4-Fluoro-1,3-dioxolan-2-one | 0.52 | −8.44 |
| A2 | Ethylene sulfite | −0.60 | −7.73 |
| A3 | Vinylene carbonate | 0.00 | −6.91 |
| A4 | γ-Butyrolactone | 0.33 | −7.21 |
| A5 | Nitromethane | −1.88 | −8.00 |
| A6 | Dimethyl oxalate | −1.58 | −7.29 |
| A7 | Diethyl carbonate | 1.25 | −7.56 |
| A8 | 3-Methoxy propionitrile | 0.82 | −7.46 |
| A9 | Biphenyl oxalate | −1.99 | −6.69 |
| A10 | Ethylene carbonate | 0.93 | −8.00 |
| A11 | Vinyl ethylene carbonate | −0.52 | −7.73 |
| A12 | 4,5-Dimethylvinylene carbonate | 0.44 | −6.34 |
| A13 | Ethyl acetate | 0.41 | −7.13 |
| A14 | 1,3-Propane sultone | −0.33 | −8.30 |
| A15 | 1,4-butane sultone | −0.35 | −8.54 |
| A16 | Sulfolane | −0.30 | −7.84 |
| A17 | 3-Sulfolene | −0.33 | −7.67 |
| A18 | Propylene sulfite | 0.00 | −7.29 |
| A19 | Pentene sulfite | 0.14 | −7.07 |
| A20 | Tetramethylene sulfoxide | −0.14 | −6.26 |

<Preparation of Electrolyte Solution 1>

A lithium salt was added to a solvent to a predetermined concentration, so as to produce an electrolyte solution (D) (hereinafter, the electrolyte solution (D) before addition of an additive(s) is referred to as a "mother electrolyte solution (D)"). The additive(s) were added to the mother electrolyte solution (D) to a predetermined concentration, so as to obtain an electrolyte solution (d). The electrolyte solutions obtained by this preparation method are shown as S1 to S22 in Table 3, and as S23 to S45 in Table 4.

TABLE 3

| | | Electrolyte solution (d) | | | | | | | |
|---|---|---|---|---|---|---|---|---|---|
| | | Mother electrolyte solution (D) | | | | | | | |
| | | Organic lithium salt | | Inorganic lithium salt | | Additive | | | |
| | | | | | | Additive 1 | | Additive 2 | |
| No. | Solvent | No. | Conc. [mol/L] | No. | Conc. [mol/L] | No. | Conc. [mass %] | No. | Conc. [mass %] |
| S1 | Acetonitrile | L1 | 1 | — | — | — | — | — | — |
| S2 | Acetonitrile | — | — | L7 | 1 | — | — | — | — |
| S3 | Acetonitrile | L1 | 1 | — | — | A1 | 10 | — | — |
| S4 | Acetonitrile | L2 | 1 | — | — | — | — | — | — |
| S5 | Acetonitrile | — | — | L8 | 1 | — | — | — | — |
| S6 | Acetonitrile | L3 | 1 | — | — | — | — | — | — |
| S7 | Acetonitrile | L1 | 1 | — | — | A2 | 5 | — | — |
| S8 | Acetonitrile | L1 | 1 | — | — | A3 | 10 | — | — |
| S9 | Acetonitrile | L1 | 1 | — | — | A3 | 1 | — | — |
| S10 | Acetonitrile | L1 | 1 | — | — | A4 | 30 | — | — |
| S11 | Acetonitrile | L1 | 1 | — | — | A5 | 5 | — | — |
| S12 | Acetonitrile | L1 | 1 | — | — | A6 | 5 | A7 | 20 |
| S13 | Acetonitrile | L1 | 1 | — | — | A8 | 5 | A9 | 5 |
| S14 | Acetonitrile | L4 | 1 | — | — | A3 | 3 | — | — |
| S15 | Acetonitrile | L2 | 1 | — | — | A1 | 10 | — | — |
| S16 | Acetonitrile | L4 | 1 | — | — | — | — | — | — |
| S17 | Acetonitrile | L1 | 1 | — | — | A10 | 5 | — | — |
| S18 | Acetonitrile | L1 | 1 | — | — | A1 | 30 | — | — |
| S19 | Acetonitrile/ethylene carbonate/methyl ethyl carbonate (mass ratio = 30/21/49) | L1 | 1 | — | — | A3 | 5 | — | — |

TABLE 3-continued

| | | Electrolyte solution (d) | | | | | | | |
|---|---|---|---|---|---|---|---|---|---|
| | | Mother electrolyte solution (D) | | | | | | | |
| | | Organic lithium salt | | Inorganic lithium salt | | Additive | | | |
| | | | | | | Additive 1 | | Additive 2 | |
| No. | Solvent | No. | Conc. [mol/L] | No. | Conc. [mol/L] | No. | Conc. [mass %] | No. | Conc. [mass %] |
| S20 | Acetonitrile/ethylene carbonate/methyl ethyl carbonate (mass ratio = 13/29/58) | L1 | 1 | — | — | A4 | 5 | — | — |
| S21 | Ethylene carbonate/methyl ethyl carbonate (volume ratio = 3/7) | — | — | L7 | 1 | — | — | — | — |
| S22 | Ethylene carbonate/methyl ethyl carbonate (volume ratio = 1/2) | — | — | L7 | 1 | A1 | 10 | — | — |

TABLE 4

| | | Electrolyte solution (d) | | | | | | | | | |
|---|---|---|---|---|---|---|---|---|---|---|---|
| | | Mother electrolyte solution (D) | | | | | | | | | |
| | | Organic lithium salt | | Inorganic lithium salt | | Additive | | | | | |
| | | | | | | Additive 1 | | Additive 2 | | Additive 3 | |
| No. | Solvent | No. | Conc. [mol/L] | No. | Conc. [mol/L] | No. | Conc. [mass %] | No. | Conc. [mass %] | Compound | Conc. [mass %] |
| S23 | Acetonitrile | L1 | 0.9 | L7 | 0.1 | A1 | 10 | — | — | — | — |
| S24 | Acetonitrile | L1 | 0.9 | L7 | 0.1 | A1 | 10 | — | — | 1-Ethyl pyridinium $PF_6$ | 1.5 |
| S25 | Acetonitrile | L1 | 0.9 | L7 | 0.1 | A1 | 10 | — | — | Succinonitrile | 1.5 |
| S26 | Acetonitrile | L1 | 0.9 | L7 | 0.1 | A1 | 10 | — | — | Glutaronitrile | 1.5 |
| S27 | Acetonitrile | L1 | 0.9 | L7 | 0.1 | A1 | 10 | — | — | Adiponitrile | 10 |
| S28 | Acetonitrile | L1 | 0.9 | L7 | 0.1 | A3 | 10 | A2 | 3 | Succinonitrile | 1.5 |
| S29 | Acetonitrile | L5 | 0.9 | L7 | 0.1 | A3 | 5 | — | — | — | — |
| S30 | Acetonitrile | L5 | 0.7 | L8 | 0.3 | A3 | 5 | — | — | — | — |
| S31 | Acetonitrile | L1 | 0.4 | L7 | 0.4 | A3 | 10 | A2 | 3 | — | — |
| S32 | Acetonitrile | L6 | 0.7 | L7 | 0.03 | A1 | 15 | — | — | — | — |
| S33 | Acetonitrile | L1 | 0.8 | L9 | 0.7 | A1 | 10 | — | — | — | — |
| S34 | Acetonitrile | L1 | 0.9 | L7 | 0.1 | A11 | 15 | — | — | — | — |
| S35 | Acetonitrile | L1 | 0.9 | L7 | 0.1 | A12 | 15 | — | — | — | — |
| S36 | Acetonitrile | L1 | 0.9 | L7 | 0.1 | A13 | 20 | — | — | — | — |
| S37 | Acetonitrile | L1 | 1 | L7 | 0.5 | A3 | 10 | A14 | 6 | — | — |
| S38 | Acetonitrile | L1 | 1 | L7 | 0.5 | A3 | 10 | A15 | 6 | — | — |
| S39 | Acetonitrile | L1 | 1 | L7 | 0.5 | A3 | 10 | A16 | 5 | — | — |
| S40 | Acetonitrile | L1 | 1 | L7 | 0.5 | A3 | 5 | A17 | 5 | — | — |
| S41 | Acetonitrile | L1 | 1 | L7 | 0.5 | A3 | 5 | A18 | 6 | — | — |
| S42 | Acetonitrile | L1 | 1 | L7 | 0.5 | A3 | 8 | A19 | 4 | — | — |
| S43 | Acetonitrile | L1 | 1 | L7 | 0.5 | A3 | 15 | A20 | 8 | — | — |
| S44 | Acetonitrile | L1 | 0.9 | L7 | 0.1 | A3 | 10 | A2 | 3 | Succinonitrile | 1.5 |
| S45 | Acetonitrile | L1 | 0.9 | L7 | 0.1 | A3 | 10 | A2 | 3 | — | — |

<Preparation of Electrolyte Solution 2>

A solvent was mixed with additives at a desired volume ratio, thereby resulting in 100 volume %. Then, lithium salts were further added to the mixture to a predetermined concentration, so as to produce an electrolyte solution (e). The electrolyte solutions obtained by this preparation method are shown as S46 and S47 in Table 5.

TABLE 5

| | Electrolyte solution (e) | | | | | | | | |
|---|---|---|---|---|---|---|---|---|---|
| | Ingredients other than lithium salt | | | | | | Lithium salt | | |
| | | | | | | | Organic lithium salt | | Inorganic lithium salt |
| | | | | Additive | | | | | |
| No. | Solvent | Conc. [vol. %] | No. | Conc. [vol. %] | No. | Conc. [vol. %] | No. | Conc. [mol/L] | No. | Conc. [mol/L] |
| S46 | Acetonitrile | 87 | A3 | 11 | A2 | 2 | L1 | 0.9 | L7 | 0.1 |
| S47 | Acetonitrile | 85 | A3 | 11 | A2 | 4 | L1 | 0.9 | L7 | 0.1 |

<Assembly of Monolayer Laminate Type Battery (SL1)>

Lithium cobaltate ($LiCoO_2$) with a number-average particle diameter of 7.4 μM serving as a positive-electrode active material, acetylene black with a number-average particle diameter of 48 nm serving as a conductive aid, and polyvinylidene fluoride (PVdF) serving as a binder were mixed at a mass ratio of 89.3:5.2:5.5. To the obtained mixture, N-methyl-2-pyrrolidone was further added as a solvent, so as to prepare a slurry-state solution. This slurry-state solution was applied onto an aluminum foil having a thickness of 30 μm and a width of 200 mm, and the solvent was then removed by drying. The resultant was rolled by applying pressure using a roll press, and it was then subjected to vacuum drying at 150° C. for 10 hours. Thereafter, the resultant was punched out into a piece with a size of 14 mm×20 mm, so as to obtain a positive electrode (α). It is to be noted that the above described slurry-state solution was prepared, while adjusting the amount of the solvent such that the amount applied to one surface of the obtained electrode that was a composite after completion of the vacuum drying could be 24.6 mg/cm²±3%, the thickness on one surface thereof could be 82 μm±3%, the density thereof could be 3.00 g/cm³±3%, and the applied width thereof with respect to the width of the aluminum foil (200 mm) could be 150 mm.

Graphite carbon powder (trade name "MCMB25-28", manufactured by Osaka Gas Chemicals Co., Ltd.) with a number-average particle diameter of 25 μm serving as a negative-electrode active material, acetylene black with a number-average particle diameter of 48 nm serving as a conductive aid, and polyvinylidene fluoride (PVdF) serving as a binder were mixed at a mass ratio of 93.0:2.0:5.0. Thereafter, N-methyl-2-pyrrolidone was further added to the obtained mixture, so as to prepare a slurry-state solution. This slurry-state solution was applied onto a copper foil having a thickness of 18 μm and a width of 200 mm, and the solvent was then removed by drying. The resultant was rolled by applying pressure using a roll press, and it was then subjected to vacuum drying at 150° C. for 10 hours. Thereafter, the resultant was punched out into a piece with a size of 15 mm×21 mm, so as to obtain a negative electrode (α). It is to be noted that the above described slurry-state solution was prepared, while adjusting the amount of the solvent such that the amount applied to one surface of the obtained electrode that was a composite after completion of the vacuum drying could be 11.8 mg/cm²±3%, the thickness on one surface thereof could be 83 μm±3%, the density thereof could be 1.42 g/cm³±3%, and the applied width thereof with respect to the width of the copper foil (200 mm) could be 150 mm.

Two slices of laminate films formed by lamination of an aluminum layer and a resin layer (without drawing, a thickness of 120 μm, 31 mm×37 mm) were laminated with the aluminum layer side outward, and the three sides were then sealed, so as to produce a laminate cell outer package. Subsequently, a microporous film made of polyethylene (a film thickness of 20 μm, 16 mm×22 mm) was prepared as a separator, then, the positive electrode (α) and the negative electrode (α), as prepared above, were laminated on both sides of the separator to produce a laminated body, and then, the laminated body was disposed in the laminate cell outer package. Thereafter, the electrolyte solution was poured into the cell outer package, so that the laminated body was immersed in the electrolyte solution. It is to be noted that the injection of the electrolyte solution was repeatedly carried out under the atmospheric pressure and a reduced pressure of 100 mmHg, until air bubbles were not generated. The remaining one side of the laminate cell outer package was sealed under an environment in which the pressure was reduced to 100 mmHg, so as to produce a non-aqueous secondary battery (monolayer laminate type battery). The thus produced battery was retained at 25° C. for 24 hours, so that the laminated body was well blended with the electrolyte solution, thereby obtaining a monolayer laminate type battery (SL1) with 1 C=9 mA. Herein, 1 C indicates a current value in which when a current was constantly discharged from a fully charged battery, the discharge was completed for 1 hour.

<Assembly of Monolayer Laminate Type Low Voltage Battery (SL2)>

Lithium cobaltate ($LiCoO_2$) with a number-average particle diameter of 7.4 μM serving as a positive-electrode active material, acetylene black with a number-average particle diameter of 48 nm serving as a conductive aid, and polyvinylidene fluoride (PVdF) serving as a binder were mixed at a mass ratio of 89.3:5.2:5.5. To the obtained mixture, N-methyl-2-pyrrolidone was further added, so as to prepare a slurry-state solution. This slurry solution was applied onto an aluminum foil having a thickness of 30 μm and a width of 200 mm, and the solvent was then removed by drying. The resultant was rolled by applying pressure using a roll press, and it was then subjected to vacuum drying at 150° C. for 10 hours. Thereafter, the resultant was punched out into a piece with a size of 14 mm×20 mm, so as to obtain a positive electrode (β). It is to be noted that the above described slurry solution was prepared, while adjusting the amount of the solvent such that the amount applied to one surface of the obtained electrode that was a composite after completion of the vacuum drying could be 12.0 mg/cm$^2$±3%, the thickness on one surface thereof could be 40 μm±3%, the density thereof could be 3.00 g/cm$^3$±3%, and the applied width thereof with respect to the width of the aluminum foil (200 mm) could be 150 mm.

$Li_4Ti_5O_{12}$ with a number-average particle diameter of 7.4 μm serving as a negative-electrode active material, acetylene black with a number-average particle diameter of 48 nm serving as a conductive aid, and polyvinylidene fluoride (PVdF) serving as a binder were mixed at a mass ratio of 82.0:8.0:10.0. Thereafter, N-methyl-2-pyrrolidone was further added to the obtained mixture, so as to prepare a slurry-state solution. This slurry solution was applied onto a copper foil having a thickness of 18 μm and a width of 200 mm, and the solvent was then removed by drying. The resultant was rolled by applying pressure using a roll press, and it was then subjected to vacuum drying at 150° C. for 10 hours. Thereafter, the resultant was punched out into a piece with a size of 15 mm×21 mm, so as to obtain a negative electrode (β). It is to be noted that the above described slurry solution was prepared, while adjusting the amount of the solvent such that the amount applied to one surface of the obtained electrode that was a composite after completion of the vacuum drying could be 14.7 mg/cm$^2$±3%, the thickness on one surface thereof could be 79 μm±3%, the density thereof could be 1.86 g/cm$^3$±3%, and the applied width thereof with respect to the width of the copper foil (200 mm) could be 150 mm.

Two slices of laminate films formed by lamination of an aluminum layer and a resin layer (without drawing, a thickness of 120 μm, 31 mm×37 mm) were laminated with the aluminum layer side outward, and the three sides were then sealed, so as to produce a laminate cell outer package. Subsequently, a microporous film made of polyethylene (a film thickness of 20 μm, 16 mm×22 mm) was prepared as a separator, then, the positive electrode (β) and the negative electrode (β), as prepared above, were laminated on both sides of the separator to produce a laminated body, and then, the laminated body was disposed in the laminate cell outer package. Thereafter, the electrolyte solution was poured into the cell outer package, so that the laminated body was immersed in the electrolyte solution. It is to be noted that the injection of the electrolyte solution was repeatedly carried out under the atmospheric pressure and a reduced pressure of 100 mmHg, until air bubbles were not generated. The remaining one side of the laminate cell outer package was sealed under an environment in which the pressure was reduced to 100 mmHg, so as to produce a non-aqueous secondary battery (monolayer laminate type low voltage battery). The thus produced battery was retained at 25° C. for 24 hours, so that the laminated body was well blended with the electrolyte solution, thereby obtaining a monolayer laminate type low voltage battery (SL2) with 1 C=4.5 mA.

<Assembly of Small Battery (SC1)>

A complex oxide of lithium with a number-average particle diameter of 11 μm, and nickel, manganese and cobalt (element ratio: 1:1:1) serving as a positive-electrode active material, graphite carbon powder with a number-average particle diameter of 6.5 μm and acetylene black powder with a number-average particle diameter of 48 nm, which served as conductive aids, and polyvinylidene fluoride (PVdF) serving as a binder were mixed at a mass ratio of 100:4.2:1.8:4.6, respectively. To the obtained mixture, N-methyl-2-pyrrolidone was added to a solid content of 68 mass %, followed by further mixing them, so as to prepare a slurry-state solution. This slurry solution was applied onto one surface of an aluminum foil having a thickness of 20 μm, and the solvent was then removed by drying. The resultant was rolled by applying pressure using a roll press. Thereafter, the thus rolled product was punched out into a disk with a diameter of 16 mm, so as to obtain a positive electrode (γ). It is to be noted that the above described slurry solution was prepared, while adjusting the amount of the solvent such that the amount applied to one surface of the obtained electrode that was a composite after completion of the vacuum drying could be 12.0 mg/cm$^2$±3%, the thickness on one surface thereof could be 45 μm±3%, the density thereof could be 2.43 g/cm$^3$±3%, and the applied width thereof with respect to the width of the aluminum foil (200 mm) could be 150 mm.

Graphite carbon powder with a number-average particle diameter of 12.7 μm and graphite carbon powder with a number-average particle diameter of 6.5 μm, which served as negative-electrode active materials, carboxy methyl cellulose solution (solid concentration: 1.83 mass %) serving as a binder, and diene rubber (glass transition temperature: −5° C.; number-average particle diameter of 120 nm when dried; dispersion medium: water; solid concentration: 40 mass %) were mixed at a solid mass ratio of 90:10:1.44:1.76, respectively, so as to result in a total solid concentration of 45 mass %, thereby preparing a slurry-state solution. This slurry solution was applied onto one surface of a copper foil having a thickness of 10 μm, and the solvent was then removed by drying. The resultant was rolled by applying pressure using a roll press. Thereafter, the thus rolled product was punched out into a disk with a diameter of 16 mm, so as to obtain a negative electrode (γ). It is to be noted that the above described slurry solution was prepared, while adjusting the amount of the solvent such that the amount applied to one surface of the obtained electrode that was a composite after completion of the vacuum drying could be 5.0 mg/cm$^2$±3%, the thickness on one surface thereof could be 40 μm±3%, the density thereof could be 1.25 g/cm$^3$±3%, and the applied width thereof with respect to the width of the copper foil (200 mm) could be 150 mm.

The positive electrode (γ) and the negative electrode (γ), as prepared above, were laminated on both sides of a separator made of polyethylene (film thickness: 25 μm; porosity: 50%; pore diameter: 0.1 μm to 1 μm) to produce a laminated body. The thus produced laminated body was inserted into a disk-shaped battery case made of SUS. Subsequently, 0.5 mL of the electrolyte solution was poured into the battery case, so that the laminated body was immersed in the electrolyte solution. Thereafter, the battery case was hermetically sealed to produce a non-aqueous secondary battery (small battery). The thus produced battery was retained at 25° C. for 24 hours, so that the laminated body was well blended with the electrolyte solution, thereby obtaining a small battery (SC1) with 1 C=3 mA.

<Assembly of Small Battery (SC2)>

A complex oxide of lithium with a number-average particle diameter of 11 μm, and nickel, manganese and cobalt (element ratio: 1:1:1) serving as a positive-electrode active material, graphite carbon powder with a number-average particle diameter of 6.5 μm and acetylene black powder with a number-average particle diameter of 48 nm, which served as conductive aids, and polyvinylidene fluoride (PVdF) serving as a binder were mixed at a mass ratio of 100:4.2:1.8:4.6, respectively. To the obtained mixture, N-methyl-2-pyrrolidone was added to a solid content of 68 mass %, followed by further mixing them, so as to prepare a slurry-state solution. This slurry-state solution was applied onto one surface of an aluminum foil having a thickness of 20 μm, and the solvent was then removed by drying. The resultant was rolled by applying pressure using a roll press. Thereafter, the thus rolled product was punched out into a disk with a diameter of 16 mm, so as to obtain a positive electrode (δ). It is to be noted that the above described slurry-state solution was prepared, while adjusting the amount of the solvent such that the amount applied to one surface of the obtained electrode that was a composite after completion of the vacuum drying could be 24.0 mg/cm$^2$±3%, the thickness on one surface thereof could be 83 μm±3%, the density thereof could be 2.86 g/cm$^3$±3%, and the applied width thereof with respect to the width of the aluminum foil (200 mm) could be 150 mm.

Graphite carbon powder with a number-average particle diameter of 12.7 μm and graphite carbon powder with a number-average particle diameter of 6.5 μm, which served as negative-electrode active materials, carboxy methyl cellulose solution (solid concentration: 1.83 mass %) serving as a binder, and diene rubber (glass transition temperature: −5° C.; number-average particle diameter of 120 nm when dried; dispersion medium: water; solid concentration: 40 mass %) were mixed at a solid mass ratio of 90:10:1.44:1.76, respectively, so as to result in a total solid concentration of 45 mass %, thereby preparing a slurry-state solution. This slurry-state solution was applied onto one surface of a copper foil having a thickness of 10 μm, and the solvent was then removed by drying. The resultant was rolled by applying pressure using a roll press. Thereafter, the thus rolled product was punched out into a disk with a diameter of 16 mm, so as to obtain a negative electrode (δ). It is to be noted that the above described slurry-state solution was prepared, while adjusting the amount of the solvent such that the amount applied to one surface of the obtained electrode that was a composite after completion of the vacuum drying could be 10.0 mg/cm$^2$±3%, the thickness on one surface thereof could be 70 μm±3%, the density thereof could be 1.50 g/cm$^3$±3%, and the applied width thereof with respect to the width of the copper foil (200 mm) could be 150 mm.

The positive electrode (δ) and the negative electrode (δ), as prepared above, were laminated on both sides of a separator made of polyethylene (film thickness: 25 μm; porosity: 50%; pore diameter: 0.1 μm to 1 μm) to produce a laminated body. The thus produced laminated body was inserted into a disk-shaped battery case made of SUS. Subsequently, 0.5 mL of the electrolyte solution was poured into the battery case, so that the laminated body was immersed in the electrolyte solution. Thereafter, the battery case was hermetically sealed to produce a non-aqueous secondary battery (small battery). The thus produced battery was retained at 25° C. for 24 hours, so that the laminated body was well blended with the electrolyte solution, thereby obtaining a small battery (SC2) with 1 C=6 mA.

<Evaluation of Batteries>

The individual batteries to be evaluated, which had been produced as described above, were firstly subjected to initial charge in accordance with (1-1) to (1-7) below, and their discharge capacity was then measured. Thereafter, in accordance with (2-1) to (2-3), (3-1) to (3-3), (4-1) to (4-4), (5-1) and (5-2), and (6-1) below, the individual batteries were evaluated.

(1-1) Measurement 1 of Discharge Capacity of Monolayer Laminate Type Battery (SL1)

The battery (SL1) was charged at a constant current of 0.045 mA, and after the voltage had reached 3.0 V, the battery was charged at a constant voltage of 3.0 V. The charge was carried out for a total of 30 hours. Thereafter, the battery was further charged at a constant current of 1.8 mA, and after the voltage had reached 4.2 V, the battery was charged at a constant voltage of 4.2 V. The charge was carried out for a total of 8 hours. Thereafter, discharge capacity was measured, when the battery was discharged to 2.75 V at a constant current of 1.8 mA. For this measurement, the temperature around the battery was set at 25° C.

(1-2) Measurement 2 of Discharge Capacity of Monolayer Laminate Type Battery (SL1)

The battery (SL1) was charged at a constant current of 1.8 mA, and after the voltage had reached 4.2 V, the battery was charged at a constant voltage of 4.2 V. The charge was carried out for a total of 8 hours. Thereafter, discharge capacity was measured, when the battery was discharged to 2.75 V at a constant current of 1.8 mA. For this measurement, the temperature around the battery was set at 25° C.

(1-3) Measurement of Discharge Capacity of Monolayer Laminate Type Low Voltage Battery (SL2)

The battery (SL2) was charged at a constant current of 0.9 mA, and after the voltage had reached 2.7 V, the battery was charged at a constant voltage of 2.7 V. The charge was carried out for a total of 8 hours. Thereafter, discharge capacity was measured, when the battery was discharged to 1.5 V at a constant current of 0.9 mA. For this measurement, the temperature around the battery was set at 25° C.

(1-4) Measurement 1 of Discharge Capacity of Small Battery (SC1)

The battery (SC1) was charged at a constant current of 0.6 mA, and after the voltage had reached 4.2 V, the battery was charged at a constant voltage of 4.2 V. The charge was carried out for a total of 8 hours. Thereafter, discharge capacity was measured, when the battery was discharged to 2.75 V at a constant current of 0.6 mA. For this measurement, the temperature around the battery was set at 25° C.

(1-5) Measurement of Discharge Capacity of Small Battery (SC2)

The battery (SC2) was charged at a constant current of 0.03 mA, and after the voltage had reached 3.0 V, the battery was charged at a constant voltage of 3.0 V. The charge was carried out for a total of 30 hours. Thereafter, the battery was further charged at a constant current of 1.2 mA, and after the voltage had reached 4.2 V, the battery was charged at a constant voltage of 4.2 V. The charge was carried out for a total of 8 hours. Thereafter, discharge capacity was measured, when the battery was discharged to 3.0 V at a constant current of 2 mA. For this measurement, the temperature around the battery was set at 25° C.

(1-6) Measurement 2 of Discharge Capacity of Small Battery (SC1)

The battery (SC1) was charged at a constant current of 0.015 mA, and after the voltage had reached 3.0 V, the battery was charged at a constant voltage of 3.0 V. The charge was carried out for a total of 30 hours. Thereafter, the battery was further charged at a constant current of 0.6 mA, and after the voltage had reached 4.2 V, the battery was charged at a constant voltage of 4.2 V. The charge was carried out for a total of 8 hours. Thereafter, discharge capacity was measured, when the battery was discharged to 3.0 V at a constant current of 1 mA. For this measurement, the temperature around the battery was set at 25° C.

(1-7) Measurement 3 of Discharge Capacity of Monolayer Laminate Type Battery (SL1)

The battery (SL1) was charged at a constant current of 0.45 mA for 2 hours, and was then charged at a constant current of 2.7 mA. After the voltage had reached 4.2 V, the battery was charged at a constant voltage of 4.2 V. The charge was carried out for a total of 8 hours. Thereafter, discharge capacity was measured, when the battery was discharged to 3.0 V at a constant current of 2.7 mA. For this measurement, the temperature around the battery was set at 25° C.

(2-1) Measurement 1 of Discharge Capacity of Monolayer Laminate Type Battery (SL1) at Low Temperature The temperature around the battery (SL1) was set at 25° C. during charge, and the battery was charged at a constant current of 1.8 mA. After the voltage had reached 4.2 V, the battery was charged at a constant voltage of 4.2 V. The charge was carried out for a total of 8 hours. The temperature around the battery was set at −30° C., −20° C., and 25° C. during discharge. Thus, discharge capacity was measured, when the battery was discharged to 2.75 V at a constant current of 4.5 mA.

(2-2) Measurement of Discharge Capacity of Small Battery (SC1) at Low Temperature The temperature around the battery (SC1) was set at 25° C. during charge, and the battery was charged at a constant current of 0.6 mA. After the voltage had reached 4.2 V, the battery was charged at a constant voltage of 4.2 V. The charge was carried out for a total of 8 hours. The temperature around the battery was set at −30° C., −20° C., and 25° C. during discharge. Thus, discharge capacity was measured, when the battery was discharged to 2.75 V at a constant current of 1.5 mA.

(2-3) Measurement 2 of Discharge Capacity of Monolayer Laminate Type Battery (SL1) at Low Temperature The temperature around the battery (SL1) was set at 25° C. during charge, and the battery was charged at a constant current of 2.7 mA. After the voltage had reached 4.2 V, the battery was charged at a constant voltage of 4.2 V. The charge was carried out for a total of 8 hours. The temperature around the battery was set at −30° C., −20° C., and 25° C. during discharge. Thus, discharge capacity was measured, when the battery was discharged to 3.0 V at a constant current of 2.7 mA.

(3-1) Measurement of Discharge Capacity of Monolayer Laminate Type Battery (SL1) at High Rate (Rate Test)

The battery (SL1) was charged at a constant current of 1.8 mA, and after the voltage had reached 4.2 V, the battery was charged at a constant voltage of 4.2 V. The charge was carried out for a total of 8 hours. Thereafter, discharge capacity was measured in each case in which the battery was discharged to 2.75 V at a constant current of 18 mA or 45 mA. For this measurement, the temperature around the battery was set at 25° C.

(3-2) Measurement of Discharge Capacity of Small Battery (SC1) at High Rate (Rate Test)

The battery (SC1) was charged at a constant current of 0.6 mA, and after the voltage had reached 4.2 V, the battery was charged at a constant voltage of 4.2 V. The charge was carried out for a total of 8 hours. Thereafter, discharge capacity was measured in each case in which the battery was discharged to 2.75 V at a constant current of 15 mA or 30 mA. For this measurement, the temperature around the battery was set at 25° C.

(3-3) Measurement of Discharge Capacity of Small Battery (SC2) at High Rate (Rate Test)

The battery (SC2) was charged at a constant current of 6 mA, and after the voltage had reached 4.2 V, the battery was charged at a constant voltage of 4.2 V. The charge was carried out for a total of 3 hours. Thereafter, discharge capacity was measured in each case in which the battery was discharged to 3.0 V at a constant current of 6 mA or 30 mA. For this measurement, the temperature around the battery was set at 25° C.

(4-1) Measurement of Capacity Retention Rate of Monolayer Laminate Type Battery (SL1) (Cycle Test)

The measurement described in (1-1) above was carried out on the monolayer laminate type battery (SL1), and thereafter, the following measurement was also carried out on it. First, the battery was charged at a constant current of 1.8 mA, and after the voltage had reached 4.2 V, the battery was charged at a constant voltage of 4.2 V. The charge was carried out for a total of 8 hours. Thereafter, the battery was discharged to 2.75 V at a constant current of 1.8 mA. This step of carrying out charge and discharge each one time was defined as one cycle. The measurement described in (1-1) above was carried out in the $1^{st}$ cycle, and 10 cycles of charge and discharge were carried out. When the discharge capacity obtained in the $1^{st}$ cycle was set at 100%, the percentage of the discharge capacity in the $10^{th}$ cycle was defined as capacity retention rate. For this measurement, the temperature around the battery was set at 25° C.

(4-2) Measurement of Capacity Retention Rate of Monolayer Laminate Type Battery (SL1) (Cycle Test)

The measurement described in (1-2) above was carried out on the monolayer laminate type battery (SL1), and thereafter, the following measurement was also carried out on it. First, the battery was charged at a constant current of 1.8 mA, and after the voltage had reached 4.2 V, the battery was charged at a constant voltage of 4.2 V. The charge was carried out for a total of 8 hours. Thereafter, the battery was discharged to 2.75 V at a constant current of 1.8 mA. This step of carrying out charge and discharge each one time was defined as one cycle. The measurement described in (1-2) above was carried out in the $1^{st}$ cycle, and 10 cycles of charge and discharge were carried out. When the discharge capacity obtained in the $1^{st}$ cycle was set at 100%, the percentage of the discharge capacity in the $10^{th}$ cycle was defined as capacity retention rate. For this measurement, the temperature around the battery was set at 25° C.

(4-3) 25° C. Long-Term Cycle Test of Small Battery (SC1)

The measurement described in (1-6) above was carried out on the small battery (SC1), and thereafter, the following measurement was also carried out on it. First, the battery was charged at a constant current of 3 mA, and after the voltage had reached 4.2 V, the battery was charged at a constant voltage of 4.2 V. The charge was carried out for a total of 3 hours. Thereafter, the battery was discharged to 3.0 V at a constant current of 3 mA. This step of carrying out charge and discharge each one time was defined as one cycle, and the charge and discharge operations were repeated for at most 90 cycles. The measurement described in (1-6) above was not counted as a cycle, and when the discharge capacity obtained in the $1^{st}$ cycle was set at 100%, the percentage of discharge capacity in a certain cycle was defined as capacity retention rate. The capacity retention rate in each of the $10^{th}$, $45^{th}$, and $90^{th}$ cycles were measured. The measurement was terminated at the time point at which the capacity retention rate became less than 10%. For this measurement, the temperature around the battery was set at 25° C.

(4-4) 25° C. Long-Term Cycle Test of Small Battery (SC2)

The measurement described in (1-5) above was carried out on the small battery (SC2), and thereafter, the following measurement was also carried out on it. First, the battery was charged at a constant current of 6 mA, and after the voltage had reached 4.2 V, the battery was charged at a constant voltage of 4.2 V. The charge was carried out for a total of 3 hours. Thereafter, the battery was discharged to 3.0 V at a constant current of 6 mA. This step of carrying out charge and discharge each one time was defined as one cycle, and the charge and discharge operations were repeated for at most 90 cycles. The measurement described in (1-5) above was not counted as a cycle, and when the discharge capacity obtained in the $1^{st}$ cycle was set at 100%, the percentage of discharge capacity in a certain cycle was defined as capacity retention rate. The capacity retention rate in each of the $10^{th}$, $45^{th}$, and $90^{th}$ cycles were measured. The measurement was terminated at the time point at which the capacity retention rate became less than 10%. For this measurement, the temperature around the battery was set at 25° C.

(5-1) 50° C. Cycle Test of Small Battery (SC1)

The measurement described in (1-6) above was carried out on the small battery (SC1), and thereafter, the following measurement was also carried out on it. First, the battery was charged at a constant current of 3 mA, and after the voltage had reached 4.2 V, the battery was charged at a constant voltage of 4.2 V. The charge was carried out for a total of 3 hours. Thereafter, the battery was discharged to 3.0 V at a constant current of 3 mA. This step of carrying out charge and discharge each one time was defined as one cycle, and the charge and discharge operations were repeated for 15 cycles. The measurement described in (1-6) above was not counted as a cycle, and when the discharge capacity obtained in the $1^{st}$ cycle was set at 100%, the percentage of discharge capacity in a certain cycle was defined as capacity retention rate. The capacity retention rate of the $15^{th}$ cycle was measured. The measurement was terminated at the time point at which the capacity retention rate became less than 10%. For this measurement, the temperature around the battery was set at 50° C.

(5-2) 50° C. Cycle Test of Small Battery (SC2)

The measurement described in (1-5) above was carried out on the small battery (SC2), and thereafter, the following measurement was also carried out on it. First, the battery was charged at a constant current of 6 mA, and after the voltage had reached 4.2 V, the battery was charged at a constant voltage of 4.2 V. The charge was carried out for a total of 3 hours. Thereafter, the battery was discharged to 3.0 V at a constant current of 6 mA. This step of carrying out charge and discharge each one time was defined as one cycle, and the charge and discharge operations were repeated for 15 cycles. The measurement described in (1-5) above was not counted as a cycle, and when the discharge capacity obtained in the $1^{st}$ cycle was set at 100%, the percentage of discharge capacity in a certain cycle was defined as capacity retention rate. The capacity retention rate of the $15^{th}$ cycle was measured. The measurement was terminated at the time point at which the capacity retention rate became less than 10%. For this measurement, the temperature around the battery was set at 50° C.

(6-1) Measurement of Electrochemical Impedance Spectroscopy

Electrochemical impedance spectroscopy was measured using Frequency Response Analyzer 1400 (trade name) manufactured by Solartron, and Potentio Galvanostat 1470E (trade name) manufactured by Solartron. As measurement conditions, the amplitude was set at ±5 mV, and the frequency was set at 0.1 to 20 kHz.

Example 1

Preparation of Electrolyte Solution

Using the electrolyte solution (S1) shown in Table 3, a monolayer laminate type battery (SL1) was produced. Then, the measurement described in (1-1) above was carried out on the battery. The results are shown in Table 6.

Comparative Example 1

Using the electrolyte solution (S2) shown in Table 3, a monolayer laminate type battery (SL1) was produced. Then, the measurement described in (1-1) above was carried out on the battery. The results are shown in Table 6.

Example 2

Using the electrolyte solution (S3) shown in Table 3, a monolayer laminate type battery (SL1) was produced. Then, the measurement described in (1-1) above was carried out on the battery. The results are shown in Table 6.

Example 3

Using the electrolyte solution (S4) shown in Table 3, a monolayer laminate type battery (SL1) was produced. Then, the measurement described in (1-1) above was carried out on the battery. The results are shown in Table 6.

Comparative Example 2

Using the electrolyte solution (S5) shown in Table 3, a monolayer laminate type battery (SL1) was produced. Then, the measurement described in (1-1) above was carried out on the battery. The results are shown in Table 6.

Comparative Example 3

Using the electrolyte solution (S6) shown in Table 3, a monolayer laminate type battery (SL1) was produced. Then, the measurement described in (1-1) above was carried out on the battery. The results are shown in Table 6.

Example 4

The battery was evaluated in the same manner as that of Example 2 with the exception that the measurement described in (1-2) above was carried out instead of the measurement (1-1) above. The results are shown in Table 6.

Example 5

Using the electrolyte solution (S7) shown in Table 3, a monolayer laminate type battery (SL1) was produced. Then, the measurement described in (1-2) above was carried out on the battery. The results are shown in Table 6.

Example 6

Using the electrolyte solution (S8) shown in Table 3, a monolayer laminate type battery (SL1) was produced. Then, the measurement described in (1-2) above was carried out on the battery. The results are shown in Table 6.

Example 7

Using the electrolyte solution (S9) shown in Table 3, a monolayer laminate type battery (SL1) was produced. Then, the measurement described in (1-2) above was carried out on the battery. The results are shown in Table 6.

Example 8

Using the electrolyte solution (S10) shown in Table 3, a monolayer laminate type battery (SL1) was produced. Then, the measurement described in (1-2) above was carried out on the battery. The results are shown in Table 6.

Example 9

Using the electrolyte solution (S11) shown in Table 3, a monolayer laminate type battery (SL1) was produced. Then, the measurement described in (1-2) above was carried out on the battery. The results are shown in Table 6.

Example 10

Using the electrolyte solution (S12) shown in Table 3, a monolayer laminate type battery (SL1) was produced. Then, the measurement described in (1-2) above was carried out on the battery. The results are shown in Table 6.

Example 11

Using the electrolyte solution (S13) shown in Table 3, a monolayer laminate type battery (SL1) was produced. Then, the measurement described in (1-2) above was carried out on the battery. The results are shown in Table 6.

Example 12

Using the electrolyte solution (S14) shown in Table 3, a monolayer laminate type battery (SL1) was produced. Then, the measurement described in (1-2) above was carried out on the battery. The results are shown in Table 6.

Comparative Example 4

The battery was evaluated in the same manner as that of Comparative Example 1 with the exception that the measurement described in (1-2) above was carried out instead of the measurement (1-1) above. The results are shown in Table 6.

Comparative Example 5

The battery was evaluated in the same manner as that of Comparative Example 2 with the exception that the measurement described in (1-2) above was carried out instead of the measurement (1-1) above. The results are shown in Table 6.

Example 13

Using the electrolyte solution (S3) shown in Table 3, a small battery (SC1) was produced. Then, the measurement described in (1-4) above was carried out on the battery. The results are shown in Table 6.

Example 14

Using the electrolyte solution (S15) shown in Table 3, a small battery (SC1) was produced. Then, the measurement described in (1-4) above was carried out on the battery. The results are shown in Table 6.

Comparative Example 6

Using the electrolyte solution (S6) shown in Table 3, a small battery (SC1) was produced. Then, the measurement described in (1-4) above was carried out on the battery. The results are shown in Table 6.

TABLE 6

| | Electrolyte solution | Battery | Battery evaluation | Discharge capacity [mAh] |
|---|---|---|---|---|
| Example 1 | S1 | SL1 | 1-1 | 7.86 |
| Comparative Example 1 | S2 | SL1 | 1-1 | 0.07 |
| Example 2 | S3 | SL1 | 1-1 | 8.73 |
| Example 3 | S4 | SL1 | 1-1 | 7.79 |
| Comparative Example 2 | S5 | SL1 | 1-1 | 0.01 |
| Comparative Example 3 | S6 | SL1 | 1-1 | 0.03 |
| Example 4 | S3 | SL1 | 1-2 | 8.44 |
| Example 5 | S7 | SL1 | 1-2 | 8.49 |
| Example 6 | S8 | SL1 | 1-2 | 8.30 |
| Example 7 | S9 | SL1 | 1-2 | 8.21 |
| Example 8 | S10 | SL1 | 1-2 | 8.36 |
| Example 9 | S11 | SL1 | 1-2 | 8.54 |
| Example 10 | S12 | SL1 | 1-2 | 8.25 |
| Example 11 | S13 | SL1 | 1-2 | 8.33 |
| Example 12 | S14 | SL1 | 1-2 | 8.99 |
| Comparative Example 4 | S2 | SL1 | 1-2 | 0.07 |
| Comparative Example 5 | S5 | SL1 | 1-2 | 0.01 |
| Example 13 | S3 | SC1 | 1-4 | 3.10 |
| Example 14 | S15 | SC1 | 1-4 | 3.11 |
| Comparative Example 6 | S6 | SC1 | 1-4 | 0.01 |

Example 15

Using the electrolyte solution (S16) shown in Table 3, a monolayer laminate type low-voltage battery (SL2) was produced. Thereafter, the measurement described in (1-3) above was carried out on the battery, and the following measurement was then carried out thereon. First, the battery was charged at a constant current of 0.9 mA, and after the voltage had reached 2.7 V, it was charged at a constant voltage of 2.7 V. The charge was carried out for a total of 8 hours. Thereafter, the battery was discharged to 1.5 V at a constant current of 0.9 mA. This step of carrying out charge and discharge each one time was defined as one cycle. The measurement described in (1-3) above was carried out in the $1^{st}$ cycle, and 2 cycles of charge and discharge were carried out. When the discharge capacity obtained in the $1^{st}$ cycle was set at 100%, the percentage of the discharge capacity in the $2^{nd}$ cycle was defined as capacity retention rate. For this measurement, the temperature around the battery was set at 25° C. Moreover, using the above described battery after 2 cycles of charging operations, the measurement described in (6-1) above was carried out. The results are shown in Table 7.

Comparative Example 7

The battery was evaluated in the same manner as that of Example 15 with the exception that the electrolyte solution (S2) was used instead of the electrolyte solution (S16). The results are shown in Table 7.

TABLE 7

| | Electrolyte solution | Battery | Battery evaluation | Discharge capacity [mAh] | Capacity retention rate [%] | Impedance [Ω] 20 kHz | Impedance [Ω] 0.1 kHz |
|---|---|---|---|---|---|---|---|
| Example 15 | S16 | SL2 | 1-3 | 4.44 | 96.2 | 1.06 | 7.83 |
| Comparative Example 7 | S2 | SL2 | 1-3 | 4.18 | 83.3 | 1.33 | 31.23 |

Example 16

Using the electrolyte solution (S3) shown in Table 3, a monolayer laminate type battery (SL1) was produced, and the measurement described in (4-1) was then carried out on the produced battery. In addition, using the above described battery after 10 cycles of charging operations, the measurement described in (6-1) above was carried out. The results are shown in Table 8.

Example 17

Using the electrolyte solution (S3) shown in Table 3, a monolayer laminate type battery (SL1) was produced, and the measurement described in (4-2) above was then carried out on the produced battery. In addition, using the above described battery after 10 cycles of charging operations, the measurement described in (6-1) above was carried out. The results are shown in Table 8.

Example 18

Using the electrolyte solution (S8) shown in Table 3, a monolayer laminate type battery (SL1) was produced, and the measurement described in (4-2) above was then carried out on the produced battery. In addition, using the above described battery after 10 cycles of charging operations, the measurement described in (6-1) above was carried out. The results are shown in Table 8.

Example 19

Using the electrolyte solution (S10) shown in Table 3, a monolayer laminate type battery (SL1) was produced, and the measurement described in (4-2) above was then carried out on the produced battery. In addition, using the above described battery after 10 cycles of charging operations, the measurement described in (6-1) above was carried out. The results are shown in Table 8.

Example 20

Using the electrolyte solution (S17) shown in Table 3, a monolayer laminate type battery (SL1) was produced, and the measurement described in (4-2) above was then carried out on the produced battery. However, since capacity retention rate was decreased, the capacity retention rate was measured not in the $10^{th}$ cycle but in the $7^{th}$ cycle. In addition, using the above described battery after 7 cycles of charging operations, the measurement described in (6-1) above was carried out. The results are shown in Table 8.

TABLE 8

| | Electrolyte solution | Battery | Battery evaluation | Capacity retention rate [%] | Impedance [Ω] 20 kHz | Impedance [Ω] 0.1 kHz |
|---|---|---|---|---|---|---|
| Example 16 | S3 | SL1 | 4-1 6-1 | 97.3 | 0.89 | 4.76 |
| Example 17 | S3 | SL1 | 4-2 6-1 | 96.8 | 0.91 | 5.42 |
| Example 18 | S8 | SL1 | 4-2 6-1 | 95.7 | 1.07 | 9.61 |
| Example 19 | S10 | SL1 | 4-2 6-1 | 97.9 | 1.06 | 12.08 |
| Example 20[1)] | S17 | SL1 | 4-2 6-1 | 82.4 | 1.30 | 24.65 |

[1)]Capacity retention rate and impedance measured at $7^{th}$ cycle

Example 21

The battery of Example 2 was evaluated, and the measurement described in (2-1) above was then carried out thereon. The results are shown in Table 9.

Example 22

The battery was evaluated in the same manner as that of Example 21 with the exception that the electrolyte solution (S18) was used instead of the electrolyte solution (S3). The results are shown in Table 9.

Example 23

The battery was evaluated in the same manner as that of Example 21 with the exception that the electrolyte solution (S19) was used instead of the electrolyte solution (S3). The results are shown in Table 9.

Example 24

The battery was evaluated in the same manner as that of Example 21 with the exception that the electrolyte solution (S20) was used instead of the electrolyte solution (S3). The results are shown in Table 9.

Comparative Example 8

The battery was evaluated in the same manner as that of Example 21 with the exception that the electrolyte solution (S21) was used instead of the electrolyte solution (S3). The results are shown in Table 9.

Example 25

The battery of Example 13 was evaluated, and the measurement described in (2-2) above was then carried out thereon. The results are shown in Table 9.

Comparative Example 9

The battery was evaluated in the same manner as that of Example 21 with the exception that the electrolyte solution (S22) was used instead of the electrolyte solution (S3). The results are shown in Table 9.

TABLE 9

| | Electrolyte solution | Battery | Battery evaluation | Discharge capacity [mAh] −30° C. | −20° C. | 25° C. |
|---|---|---|---|---|---|---|
| Example 21 | S3 | SL1 | 2-1 | 5.37 | 7.36 | 8.40 |
| Example 22 | S18 | SL1 | 2-1 | 4.73 | 7.21 | 8.42 |
| Example 23 | S19 | SL1 | 2-1 | 3.61 | 6.73 | 8.50 |
| Example 24 | S20 | SL1 | 2-1 | 2.80 | 6.45 | 8.31 |
| Comparative Example 8 | S21 | SL1 | 2-1 | 1.32 | 6.33 | 8.50 |
| Example 25 | S3 | SC1 | 2-2 | 2.11 | 2.34 | 3.20 |
| Comparative Example 9 | S22 | SC1 | 2-2 | 1.53 | 2.08 | 3.13 |

Example 26

The battery of Example 2 was evaluated, and the measurement described in (3-1) above was then carried out thereon. The results are shown in Table 10.

Comparative Example 10

The battery was evaluated in the same manner as that of Example 26 with the exception that the electrolyte solution (S21) was used instead of the electrolyte solution (S3). The results are shown in Table 10.

Example 27

The battery of Example 13 was evaluated, and the measurement described in (3-2) above was then carried out thereon. The results are shown in Table 10.

Comparative Example 11

The battery was evaluated in the same manner as that of Example 27 with the exception that the electrolyte solution (S22) was used instead of the electrolyte solution (S3). The results are shown in Table 10.

TABLE 10

| | Electrolyte solution | Battery | Battery evaluation | Discharge capacity [mAh] 18 mA | 45 mA |
|---|---|---|---|---|---|
| Example 26 | S3 | SL1 | 3-1 | 8.24 | 7.86 |
| Comparative Example 10 | S21 | SL1 | 3-1 | 7.29 | 1.38 |
| Example 27 | S3 | SC1 | 3-2 | 2.81 | 2.57 |
| Comparative Example 11 | S22 | SC1 | 3-2 | 2.49 | 1.28 |

Example 28

Using the electrolyte solution (S23) shown in Table 4, a small battery (SC1) was produced, and the measurement described in (4-3) above was then carried out on the produced battery. In addition, using the above described battery after 50 cycles of charging operations, the measurement described in (6-1) above was carried out. The results are shown in Table 11.

Example 29

The battery was evaluated in the same manner as that of Example 28 with the exception that the electrolyte solution (S24) was used instead of the electrolyte solution (S23). The results are shown in Table 11.

Example 30

The battery was evaluated in the same manner as that of Example 28 with the exception that the electrolyte solution (S25) was used instead of the electrolyte solution (S23). The results are shown in Table 11.

TABLE 11

| No. | Electrolyte solution | Battery | Battery evaluation | Capacity retention rate [%] $10^{th}$ Cycle | $45^{th}$ Cycle | $90^{th}$ Cycle | Impedance [Ω] 20 kHz | 0.1 kHz |
|---|---|---|---|---|---|---|---|---|
| Example 28 | S23 | SC1 | 4-3 | 98 | 89 | 75 | 3.2 | 6.4 |
| Example 29 | S24 | SC1 | 4-3 | 99 | 89 | 77 | 1.7 | 4.8 |
| Example 30 | S25 | SC1 | 4-3 | 100 | 93 | 81 | 2.3 | 4.9 |

Example 31

Using the electrolyte solution (S26) shown in Table 4, a small battery (SC1) was produced, and the measurement described in (4-3) above was then carried out on the produced battery. The results are shown in Table 12.

Example 32

The battery was evaluated in the same manner as that of Example 31 with the exception that the electrolyte solution (S27) was used instead of the electrolyte solution (S26). The results are shown in Table 12.

Example 33

The battery was evaluated in the same manner as that of Example 31 with the exception that the electrolyte solution (S28) was used instead of the electrolyte solution (S26). The results are shown in Table 12.

Example 34

Using the electrolyte solution (S23) shown in Table 4, a small battery (SC2) was produced, and the measurement described in (4-4) above was then carried out on the produced battery. The results are shown in Table 12.

Example 35

The battery was evaluated in the same manner as that of Example 34 with the exception that the electrolyte solution (S24) was used instead of the electrolyte solution (S23). The results are shown in Table 12.

Example 36

The battery was evaluated in the same manner as that of Example 34 with the exception that the electrolyte solution (S25) was used instead of the electrolyte solution (S23). The results are shown in Table 12.

Example 37

The battery was evaluated in the same manner as that of Example 34 with the exception that the electrolyte solution (S29) was used instead of the electrolyte solution (S23). The results are shown in Table 12.

Example 38

The battery was evaluated in the same manner as that of Example 34 with the exception that the electrolyte solution (S30) was used instead of the electrolyte solution (S23). The results are shown in Table 12.

Example 39

The battery was evaluated in the same manner as that of Example 34 with the exception that the electrolyte solution (S31) was used instead of the electrolyte solution (S23). The results are shown in Table 12.

Example 40

The battery was evaluated in the same manner as that of Example 34 with the exception that the electrolyte solution (S32) was used instead of the electrolyte solution (S23). The results are shown in Table 12.

Example 41

The battery was evaluated in the same manner as that of Example 34 with the exception that the electrolyte solution (S33) was used instead of the electrolyte solution (S23). The results are shown in Table 12.

Example 42

The battery was evaluated in the same manner as that of Example 34 with the exception that the electrolyte solution (S34) was used instead of the electrolyte solution (S23). The results are shown in Table 12.

Example 43

The battery was evaluated in the same manner as that of Example 34 with the exception that the electrolyte solution (S35) was used instead of the electrolyte solution (S23). The results are shown in Table 12.

Example 44

The battery was evaluated in the same manner as that of Example 34 with the exception that the electrolyte solution (S36) was used instead of the electrolyte solution (S23). The results are shown in Table 12.

Example 45

The battery was evaluated in the same manner as that of Example 34 with the exception that the electrolyte solution (S37) was used instead of the electrolyte solution (S23). The results are shown in Table 12.

Example 46

The battery was evaluated in the same manner as that of Example 34 with the exception that the electrolyte solution (S38) was used instead of the electrolyte solution (S23). The results are shown in Table 12.

Example 47

The battery was evaluated in the same manner as that of Example 34 with the exception that the electrolyte solution (S39) was used instead of the electrolyte solution (S23). The results are shown in Table 12.

Example 48

The battery was evaluated in the same manner as that of Example 34 with the exception that the electrolyte solution (S40) was used instead of the electrolyte solution (S23). The results are shown in Table 12.

Example 49

The battery was evaluated in the same manner as that of Example 34 with the exception that the electrolyte solution (S41) was used instead of the electrolyte solution (S23). The results are shown in Table 12.

Example 50

The battery was evaluated in the same manner as that of Example 34 with the exception that the electrolyte solution (S42) was used instead of the electrolyte solution (S23). The results are shown in Table 12.

Example 51

The battery was evaluated in the same manner as that of Example 34 with the exception that the electrolyte solution (S43) was used instead of the electrolyte solution (S23). The results are shown in Table 12.

TABLE 12

| No. | Electrolyte solution | Battery | Battery evaluation | Capacity retention rate [%] $10^{th}$ Cycle | $45^{th}$ Cycle | $90^{th}$ Cycle |
|---|---|---|---|---|---|---|
| Example 31 | S26 | SC1 | 4-3 | 98 | 89 | 72 |
| Example 32 | S27 | SC1 | 4-3 | 99 | 93 | 86 |
| Example 33 | S28 | SC1 | 4-3 | 99 | 94 | 88 |
| Example 34 | S23 | SC2 | 4-4 | 97 | 93 | 78 |
| Example 35 | S24 | SC2 | 4-4 | 98 | 93 | 84 |
| Example 36 | S25 | SC2 | 4-4 | 94 | 86 | 72 |
| Example 37 | S29 | SC2 | 4-4 | 95 | 90 | 77 |
| Example 38 | S30 | SC2 | 4-4 | 96 | 90 | 72 |
| Example 39 | S31 | SC2 | 4-4 | 93 | 82 | 68 |
| Example 40 | S32 | SC2 | 4-4 | 98 | 94 | 80 |

TABLE 12-continued

| No. | Electrolyte solution | Battery | Battery evaluation | Capacity retention rate [%] | | |
|---|---|---|---|---|---|---|
| | | | | $10^{th}$ Cycle | $45^{th}$ Cycle | $90^{th}$ Cycle |
| Example 41 | S33 | SC2 | 4-4 | 92 | 82 | 70 |
| Example 42 | S34 | SC2 | 4-4 | 92 | 83 | 72 |
| Example 43 | S35 | SC2 | 4-4 | 95 | 90 | 77 |
| Example 44 | S36 | SC2 | 4-4 | 99 | 92 | 78 |
| Example 45 | S37 | SC2 | 4-4 | 99 | 90 | 74 |
| Example 46 | S38 | SC2 | 4-4 | 99 | 92 | 77 |
| Example 47 | S39 | SC2 | 4-4 | 98 | 91 | 80 |
| Example 48 | S40 | SC2 | 4-4 | 98 | 88 | 75 |
| Example 49 | S41 | SC2 | 4-4 | 98 | 90 | 78 |
| Example 50 | S42 | SC2 | 4-4 | 97 | 90 | 80 |
| Example 51 | S43 | SC2 | 4-4 | 99 | 92 | 80 |

Example 52

Using the electrolyte solution (S44) shown in Table 4, a small battery (SC2) was produced, and the measurement described in (5-2) above was then carried out on the produced battery. Moreover, the same battery as described above was produced, the measurement described in (1-5) above was then carried out on the produced battery, and the measurement described in (3-3) above was then carried out thereon. The results are shown in Table 13.

Example 53

The battery was evaluated in the same manner as that of Example 52 with the exception that the electrolyte solution (S45) was used instead of the electrolyte solution (S44). The results are shown in Table 13.

TABLE 13

| | Electrolyte solution | Battery | Battery evaluation | Capacity retention rate [%] | Discharge capacity [mAh] | |
|---|---|---|---|---|---|---|
| | | | | | 6 mA | 30 mA |
| Example 52 | S44 | SC2 | 5-2 3-3 | 90 | 6.02 | 4.84 |
| Example 53 | S45 | SC2 | 5-2 3-3 | 90 | 6.1 | 5.18 |

Example 54

Using the electrolyte solution (S46) shown in Table 5, a small battery (SC1) was produced, and the measurement described in (5-1) above was then carried out on the produced battery. The results are shown in Table 14.

Example 55

The battery was evaluated in the same manner as that of Example 54 with the exception that the electrolyte solution (S47) was used instead of the electrolyte solution (S46). The results are shown in Table 14.

TABLE 14

| | Electrolyte solution | Battery | Battery evaluation | Capacity retention rate [%] |
|---|---|---|---|---|
| Example 54 | S46 | SC1 | 5-1 | 86 |
| Example 55 | S47 | SC1 | 5-1 | 88 |

Example 56

Using the electrolyte solution (S47) shown in Table 5, a small battery (SL1) was produced. Thereafter, the measurement described in (1-7) above was carried out on the produced battery, and the measurement described in (2-3) above was then carried out thereon. The results are shown in Table 15.

TABLE 15

| | Electrolyte solution | Battery | Battery evaluation | Discharge capacity [mAh] | | |
|---|---|---|---|---|---|---|
| | | | | −30° C. | −20° C. | 25° C. |
| Example 56 | S47 | SL1 | 2-3 | 3.30 | 6.30 | 8.86 |

The present application is based on two Japanese patent applications (Japanese Patent Application Nos. 2010-244503 and 2010-244513) filed on Oct. 29, 2010, and the contents thereof are incorporated herein by reference in their entirety.

INDUSTRIAL APPLICABILITY

It is anticipated that the non-aqueous secondary battery of the present invention can be used as a rechargeable battery for automobiles such as a hybrid car, a plug-in hybrid car and an electric car, as well as for portable devices such as a mobile phone, a mobile audio player, a personal computer and an IC tag, and further, as a power storage system for residence.

REFERENCE SIGNS LIST

100 . . . Lithium ion secondary battery, 110 . . . Separator, 120 . . . Positive electrode, 130 . . . Negative electrode, 140 . . . Positive electrode current collector, 150 . . . Negative electrode current collector, 160 . . . Outer package of battery

The invention claimed is:

1. A non-aqueous secondary battery comprising a non-aqueous electrolyte solution, the non-aqueous electrolyte solution comprising acetonitrile, $LiPF_6$ as an inorganic lithium salt, and an organic lithium salt, wherein an anion of the organic lithium salt has a LUMO (lowest unoccupied molecular orbital) energy in a range of −2.00 to 4.35 eV, and a HOMO (highest occupied molecular orbital) energy in a range of −5.35 to −2.90 eV, wherein the non-aqueous secondary battery comprises the non-aqueous electrolyte solution, a positive electrode, and a negative electrode, wherein the negative electrode comprises materials capable of doping lithium ions at a potential lower than 0.4 V vs. $Li/Li_{+L}$ wherein the organic lithium salt and the inorganic lithium salt satisfy the condition represented by the following formula (1):

$$0.05 \leq X \leq 1 \quad (1)$$

wherein X represents a molar ratio of the inorganic lithium salt to the organic lithium salt and wherein the organic lithium salt is at least one selected from $LiN(SO_2CF_3)_2$, $LiN(SO_2C_2F5)_2$, $LiPF_5(CF_3)$, $LiBF_3(CF_3)$, $LiB(C_2O_4)_2$, $LiBF_2(C_2O_4)$, $LiB(C_3O_4H_2)_2$ and $LiPF_4(C_2O4)$, and wherein the acetonitrile is present in an amount of 70 to 100 vol % based on the total amount of ingredients contained in the non-aqueous electrolyte solution, other than the organic lithium salt or inorganic lithium salt.

2. The non-aqueous secondary battery according to claim 1, wherein the LUMO of the anion of the organic lithium salt is in a range of −1.00 to 2.70 eV, and the HOMO is in a range of −4.50 to −3.00 eV.

3. The non-aqueous secondary battery according to claim 1, wherein the organic lithium salt is present in an amount of 0.1 to 30 mass % based on the total amount of the non-aqueous electrolyte solution.

4. The non-aqueous secondary battery according to claim 1, wherein the acetonitrile is present in an amount of 70 to 100 vol % based on the total amount of ingredients contained in the non-aqueous electrolyte solution, other than the organic lithium salt.

5. The non-aqueous secondary battery according to claim 1, wherein the inorganic lithium salt is present in an amount of 0.1 to 40 mass % based on the total amount of the non-aqueous electrolyte solution.

6. The non-aqueous electrolyte solution according to claim 1, which further comprises a non-nitrile additive having a LUMO (lowest unoccupied molecular orbital) energy in the range of −3.00 to 0.90 eV.

7. The non-aqueous electrolyte solution according to claim 6, wherein the non-nitrile additive having a LUMO (lowest unoccupied molecular orbital) energy in the range of −3.00 to 0.90 eV has a HOMO (highest occupied molecular orbital) energy in the range of −9.55 to −6.00 eV.

8. The non-aqueous electrolyte solution according to claim 6, wherein the non-nitrile additive having a LUMO (lowest unoccupied molecular orbital) energy in the range of −3.00 to 0.90 eV has a HOMO (highest occupied molecular orbital) energy in the range of −8.50 to −7.25 eV.

9. The non-aqueous electrolyte solution according to claim 6, wherein the content of the non-nitrile additive is 0.1 to 30 mass % based on the total amount of the non-aqueous electrolyte solution.

10. The non-aqueous electrolyte solution according to claim 6, wherein the content of the non-nitrile additive is 0.1 to 10 mass % based on the total amount of the non-aqueous electrolyte solution.

11. The non-aqueous electrolyte solution according to claim 6, which comprises two or more of the non-nitrile additives.

12. The non-aqueous electrolyte solution according to claim 6, wherein the non-nitrile additives comprise one or more compounds selected from the group consisting of carbonates.

13. The non-aqueous electrolyte solution according to claim 12, wherein the carbonates are cyclic carbonates.

14. The non-aqueous electrolyte solution according to claim 12, wherein the carbonates are compounds having a carbon-carbon double bond.

15. The non-aqueous electrolyte solution according to claim 6, wherein the non-nitrile additives comprise one or more compounds selected from the group consisting of compounds represented by the following general formula (2):

$$R^1\text{-A-}R^2 \quad (2)$$

wherein $R^1$ and $R^2$ each independently represent an alkyl group optionally substituted with an aryl group or a halogen atom or an aryl group optionally substituted with an alkyl group or a halogen atom, or $R^1$ and $R^2$ bind to each other, together with A, form a cyclic structure optionally having an unsaturated bond; and A represents a divalent group having a structure represented by any one of the following formulae (3) to (7):

[Formula 1]

(3)

(4)

(5)

(6)

(7)

16. The non-aqueous electrolyte solution according to claim 15, wherein, in the formula (2), $R^1$ and $R^2$ each independently represent an alkyl group comprising 1 to 4 carbon atoms that is optionally substituted with a phenyl group or a halogen atom or a phenyl group optionally substituted with a halogen atom, or $R^1$ and $R^2$ bind to each other, together with A, to form a cyclic structure optionally having an unsaturated bond.

17. The non-aqueous electrolyte solution according to claim 15, wherein the compounds represented by the formula (2) comprise one or more compounds selected from the group consisting of ethylene sulfite, propylene sulfite, butylene sulfite, pentene sulfite, sulfolane, 3-methyl sulfolane, 3-sulfolene, 1,3-propanesultone, 1,4-butanesultone, 1,3-propanediol sulfate, and tetramethylene sulfoxide.

18. The non-aqueous secondary battery according to claim 1, wherein the organic lithium salt contains a boron atom.

19. The non-aqueous secondary battery according to claim 1, wherein the organic lithium salt contains an organic ligand.

20. The non-aqueous secondary battery according to claim 1, wherein the organic lithium salt is one or more selected from the group consisting of lithium bis(oxalato)borate and lithium difluoro(oxalato)borate.

21. The non-aqueous secondary battery according to claim 1, which further comprises a dinitrile compound.

22. The non-aqueous secondary battery according to claim 21, wherein the dinitrile compound comprises one or more compounds selected from the group consisting of compounds represented by the following general formula (8):

$$NC\text{—}(CR^3R^4)_{2a}\text{—}CN \quad (8)$$

wherein $R^3$ and $R^4$ each independently represents a hydrogen atom or an alkyl group, and a represents an integer from 1 to 6.

23. The non-aqueous electrolyte solution according to claim 1, which further comprises an ionic compound.

24. The non-aqueous electrolyte solution according to claim 23, wherein the cation having a nitrogen atom is a pyridinium cation.

25. The non-aqueous electrolyte solution according to claim 23, wherein an anion of the ionic compound is $PF_6^-$.

26. A method for producing the non-aqueous secondary battery according to claim 1 comprising initially charging up to a charge of 0.001 to 0.3 C to the battery.

27. The method for producing the non-aqueous secondary battery according to claim 26, wherein the initial charge is carried out via a constant-voltage charge.

28. The non-aqueous secondary battery according to claim 1, which further comprises a non-nitrile additive having a LUMO (lowest unoccupied molecular orbital) energy in a range of −3.00 to 0.90 eV.

29. The non-aqueous secondary battery according to claim 28, wherein the non-nitrile additive has a HOMO (highest occupied molecular orbital) energy in a range of −8.50 to −7.25 eV.

* * * * *